US012674096B2

(12) United States Patent
Wang et al.

(10) Patent No.: US 12,674,096 B2
(45) Date of Patent: Jul. 7, 2026

(54) METHOD OF FORMING AN ALKALINE-EARTH METAL SELENIDE AND/OR SULFIDE COMPOUND

(71) Applicant: City University of Hong Kong, Kowloon (HK)

(72) Inventors: Feng Wang, Kowloon (HK); Yanze Wang, Kowloon (HK)

(73) Assignee: City University of Hong Kong, Kowloon (HK)

( * ) Notice: Subject to any disclaimer, the term of this patent is extended or adjusted under 35 U.S.C. 154(b) by 615 days.

(21) Appl. No.: 18/299,906

(22) Filed: Apr. 13, 2023

(65) Prior Publication Data

US 2024/0343976 A1      Oct. 17, 2024

(51) Int. Cl.
| | |
|---|---|
| *C09K 11/88* | (2006.01) |
| *C01B 17/20* | (2006.01) |
| *C01B 17/42* | (2006.01) |
| *C01B 19/00* | (2006.01) |
| *C01B 19/04* | (2006.01) |
| *H05B 33/14* | (2006.01) |

(52) U.S. Cl.
CPC ............ *C09K 11/885* (2013.01); *C01B 17/20* (2013.01); *C01B 17/42* (2013.01); *C01B 19/002* (2013.01); *C01B 19/04* (2013.01); *H05B 33/14* (2013.01); *C01P 2002/54* (2013.01); *C01P 2002/72* (2013.01); *C01P 2002/76* (2013.01); *C01P 2002/85* (2013.01); *C01P 2004/03* (2013.01); *C01P 2004/61* (2013.01)

(58) Field of Classification Search
CPC ....... C01B 17/20; C01B 17/42; C01B 19/002; C01B 19/04; C01P 2002/54; C01P 2002/72; C01P 2002/76; C01P 2002/85; C01P 2004/03; C01P 2004/61; C09K 11/885; H05B 33/14
See application file for complete search history.

(56) References Cited

FOREIGN PATENT DOCUMENTS

CN            102899033 A    *    1/2013

OTHER PUBLICATIONS

Wang et al., "Solid-State Displacement Synthesis of Alkaline-Earth Selenide for White Emission through Alternating Current Electroluminescence", ACS Materials Lett., 2022, vol. 4, p. 2447-2453 (Year: 2022).*
Yamashita, N., et al., "Luminescence of Pb2+ Centers in SrS and SrSe Phosphors"; Journal of the Physical Society of Japan, vol. 53, No. 1. Jan. 1984, pp. 419-426.
Yamashita, N., et al., "Photoluminescence Spectra of Eu2+ Centers in Ca(S,Se): Eu and Sr(S,Se): Eu", Japanese Journal of Applied Physics, vol. 34 (1995), pp. 5539-5545.

* cited by examiner

*Primary Examiner* — Gerard Higgins
(74) *Attorney, Agent, or Firm* — Renner, Kenner, Greive, Bobak, Taylor & Weber

(57) ABSTRACT

A method of forming an alkaline-earth metal selenide and/or sulfide compound is disclosed as including reacting a carbonate of an alkaline-earth metal with zinc selenide (ZnSe) and/or zinc sulfide (ZnS) in a mixture atmosphere of hydrogen gas ($H_2$) (10 vol. %) and nitrogen gas ($N_2$) at a temperature between about 1,100° C. and about 1,400° C. for not more than about 1 hour.

8 Claims, 53 Drawing Sheets

10

1: CaSe:Eu
2: CaS₀.₂Se₀.₈:Eu
3: CaS₀.₄Se₀.₆:Eu
4: CaS₀.₆Se₀.₄:Eu
5: CaS₀.₈Se₀.₂:Eu
6: CaS:Eu

METHOD OF FORMING AN ALKALINE-EARTH METAL SELENIDE AND/OR SULFIDE COMPOUND

This invention relates to a method of forming an alkaline-earth metal selenide (Se) and/or sulfide(S) compound, a compound formed of such a method, and an alternating current electroluminescence (ACEL) device including such a compound.

BACKGROUND OF THE INVENTION

Alkaline-earth metal selenides (herein referred to as "AESe", in which the alkaline-earth metal (herein referred to as "AE") may be calcium (Ca), strontium (Sr), and barium (Ba)), are an important class of functional materials that provide many research topics in solid-state physics, chemistry, and materials science. Owing to their stable structure and semiconducting behavior, AESe crystals have found applications in optical storage, X-ray imaging, and lighting devices. Compared with other kinds of selenides such as CdSe, AESe features low fabrication cost, high luminous efficiency, and large doping capacity for various impurity ions such as lanthanides for precise optical tuning. Despite such attractive characteristics, the potentials of AESe are largely unexploited due to the difficulties in developing rapid and environmentally benign routes of synthesizing AESe crystals.

Several synthetic protocols have been described to prepare AESe crystals, such as hydrothermal synthesis, co-precipitation, solid-state reaction, and solid-phase diffusion. However, these methods typically suffer from complicated fabrication processes, low product yields, and/or hazardous synthesis conditions. In a classic synthesis of SrSe, for example, $SrSeO_4$ raw materials needed to be calcined under a mixture gas stream of $H_2/H_2Se$ for 50 minutes followed by post-annealing at 1,000° C. under $N_2$ gas stream for another 1 hour. To realize $Pb^{2+}$ doping, the resulting product needed further calcination with PbS at 1,000° C. under $N_2$ gas stream for 40 minutes. Therefore, it is imperative to develop simple and efficient synthetic methods for the rapid preparation of high-quality AESe crystals.

It is thus an objective of the present invention to provide a method of forming an alkaline-earth metal selenide (AESe) and/or sulfide (AES) compound, a compound formed of such a method, and an alternating current electroluminescence (ACEL) device including such a compound, in which the aforesaid shortcomings are mitigated or at least to provide a useful alternative to the trade and public.

SUMMARY OF THE INVENTION

According to a first aspect of the present invention, there is provided method of forming an alkaline-earth metal selenide and/or sulfide compound, including reacting a carbonate of an alkaline-earth metal with zinc selenide (ZnSe) and/or zinc sulfide (ZnS) in an atmosphere of hydrogen gas ($H_2$) and nitrogen gas ($N_2$).

According to a second aspect of the present invention, there is provided an alkaline-earth metal selenide and/or sulfide compound formed by reacting a carbonate of an alkaline-earth metal with zinc selenide (ZnSe) and/or zinc sulfide (ZnS) in an atmosphere of hydrogen gas ($H_2$) and nitrogen gas ($N_2$).

According to a third aspect of the present invention, there is provided an alternating current electroluminescence device including a selenium-sulfide alloy of an alkaline-earth metal formed by reacting a carbonate of said alkaline-earth metal with zinc selenide (ZnSe) and zinc sulfide (ZnS) in an atmosphere of hydrogen gas ($H_2$) and nitrogen gas ($N_2$) and further doped with luminescent ions.

BRIEF DESCRIPTION OF THE DRAWINGS

Embodiments of the present invention will now be described, by way of example only, with reference to the accompanying drawings, in which.

DETAILED DESCRIPTION OF THE EMBODIMENTS

Figure 1:
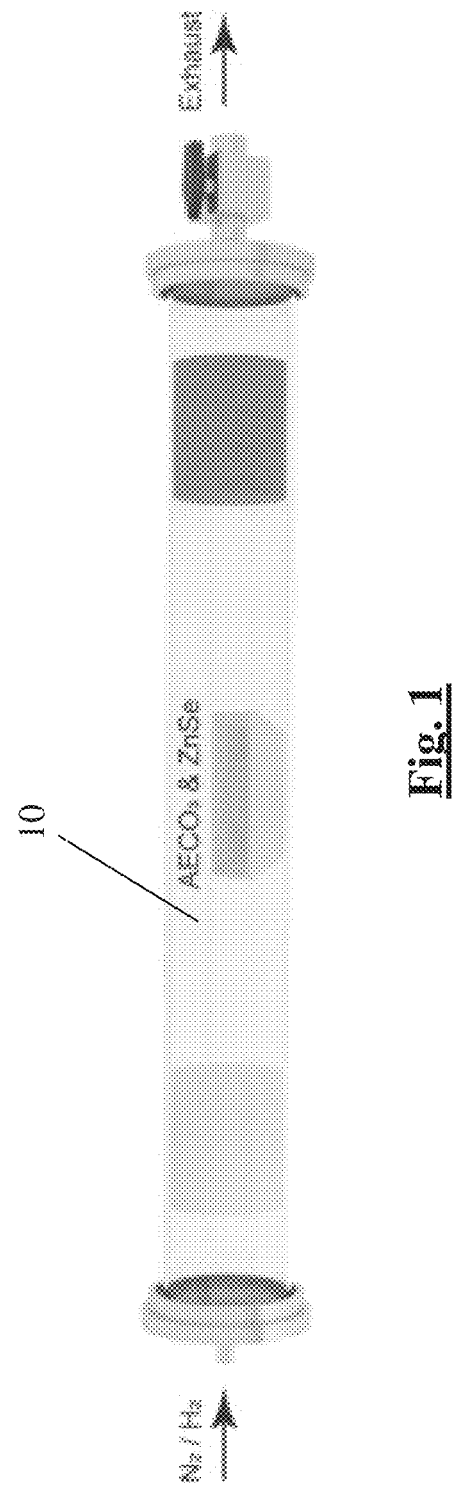
FIG. 1 shows schematically use of a quartz tube furnace for synthesizing an alkaline-earth metal selenide and/or sulfide compound according to a method of the present invention.

In a method of forming an alkaline-earth metal (herein referred to as "AE") selenide and/or sulfide compound according to the present invention, $AECO_3$ and ZnSe were used as the raw materials, which were chosen for economical and safety considerations. A quartz tube furnace 10 (as shown in FIG. 1) was used for the sample preparations. To avoid the formation of solid by-products that may contaminate the desired AESe crystals, the reaction was carried out in a reducing atmosphere consisting of $H_2$ (10 vol. %) in $N_2$. The synthesis is a one-pot solid-state displacement synthesis. Because of the existence of $H_2$, the synthesis is believed to proceed according to the following reactions:

$$AECO_3 \rightarrow AEO + CO_2 \uparrow \qquad \text{(Equation 1)}$$

$$AEO + ZnSe \rightarrow AESe + ZnO \qquad \text{(Equation 2)}$$

$$ZnO + H_2 \rightarrow Zn \uparrow + H_2O \uparrow \qquad \text{(Equation 3)}$$

For the synthesis of AESe, AECO$_3$ was mixed with ZnSe at a ratio of 1:1, ground well in an agate mortar, and then calcined at different temperatures from 800 to 1,400° C. for 1 hour under an atmosphere consisting of a mixture of H$_2$ (10 vol %) in N$_2$. AES was synthesized using the same method described above, except that the chalcogenide source in the starting materials was changed to ZnS.

Figure 2:
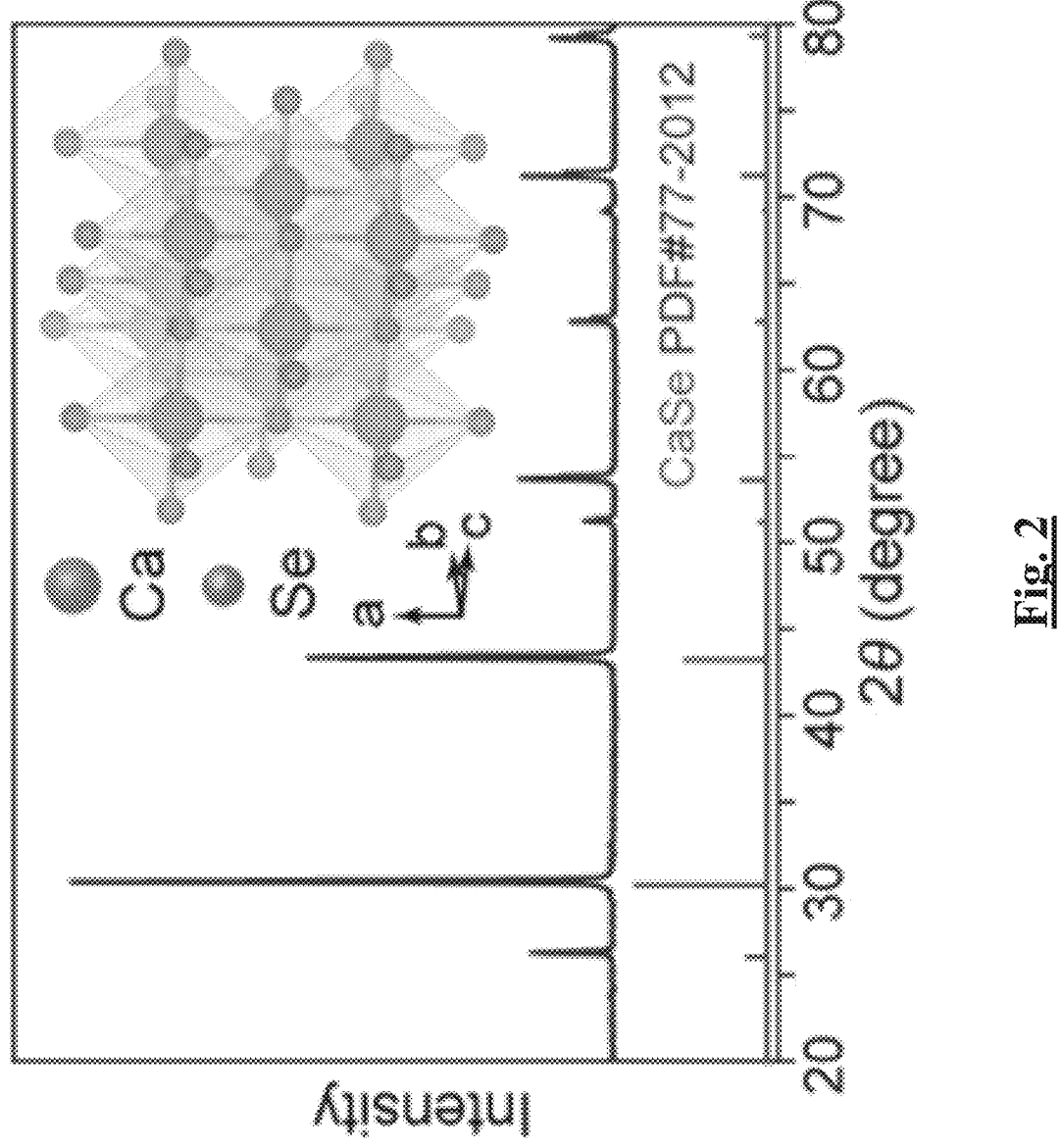
FIG. 2 shows X-ray diffraction (XRD) pattern of CaSe crystals synthesized by calcination at 1,200° C. for 1 hour in the $N_2/H_2$ mixture atmosphere according to a method of the present invention, in which the inset shows the crystal structure of the CaSe crystals.
Figure 3:
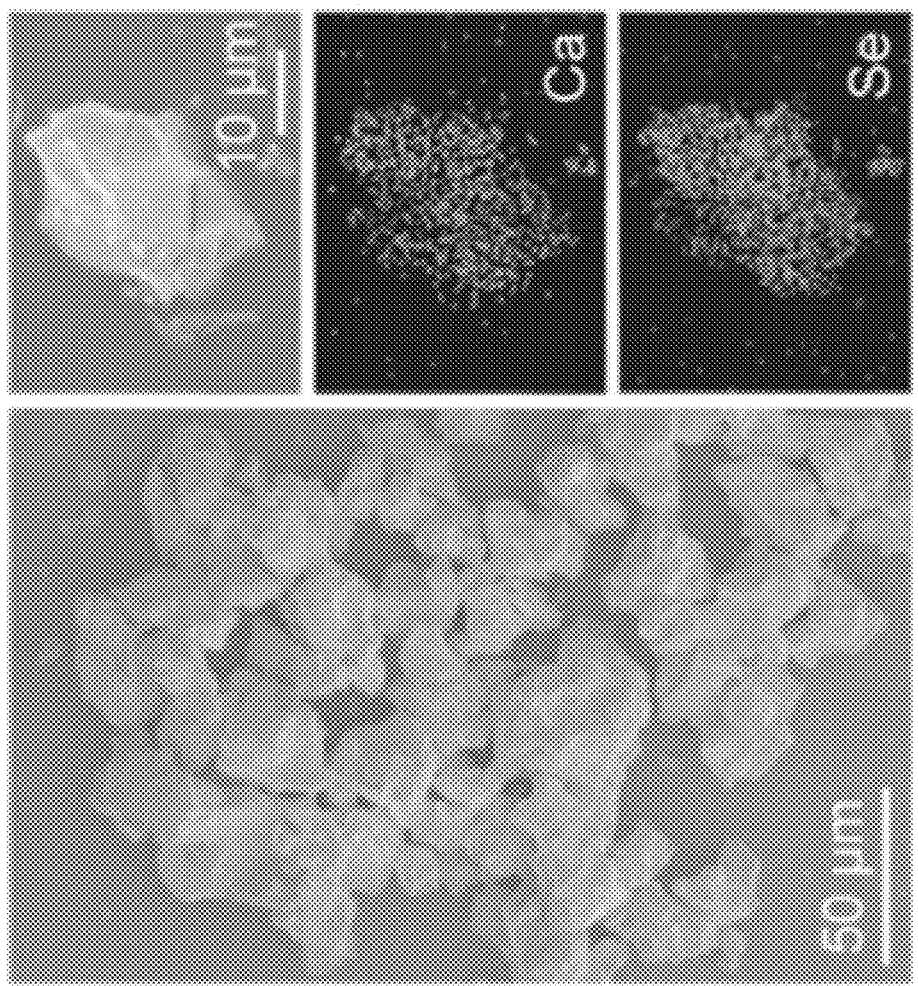
FIG. 3 shows scanning electron microscopy (SEM) image of the as-synthesized CaSe crystals and related EDX mapping of a single CaSe particle.

Since the boiling point of monomeric Zn is about 907° C., all the by-products were readily evaporated during the high-temperature synthesis, leaving behind the final product (AESe) with high purity. As an explanatory experiment, CaSe was synthesized using CaCO$_3$ and ZnSe as the raw materials. FIG. 2 shows the X-ray diffraction (XRD) pattern of a typical sample synthesized at 1,200° C. for 1 hour. All the diffraction peaks can be well indexed in accord with cubic phase CaSe, suggesting high purity and crystallinity of the product CaSe. The sample was further characterized by scanning electron microscopy (SEM), revealing an irregular particle shape with an average size of about 25 μm, as shown in FIG. 3. The energy-dispersive X-ray spectroscopy (EDX) mapping of a randomly selected particle demonstrates the uniform distribution of the constituent Ca and Se elements across the particle.

Figure 4:
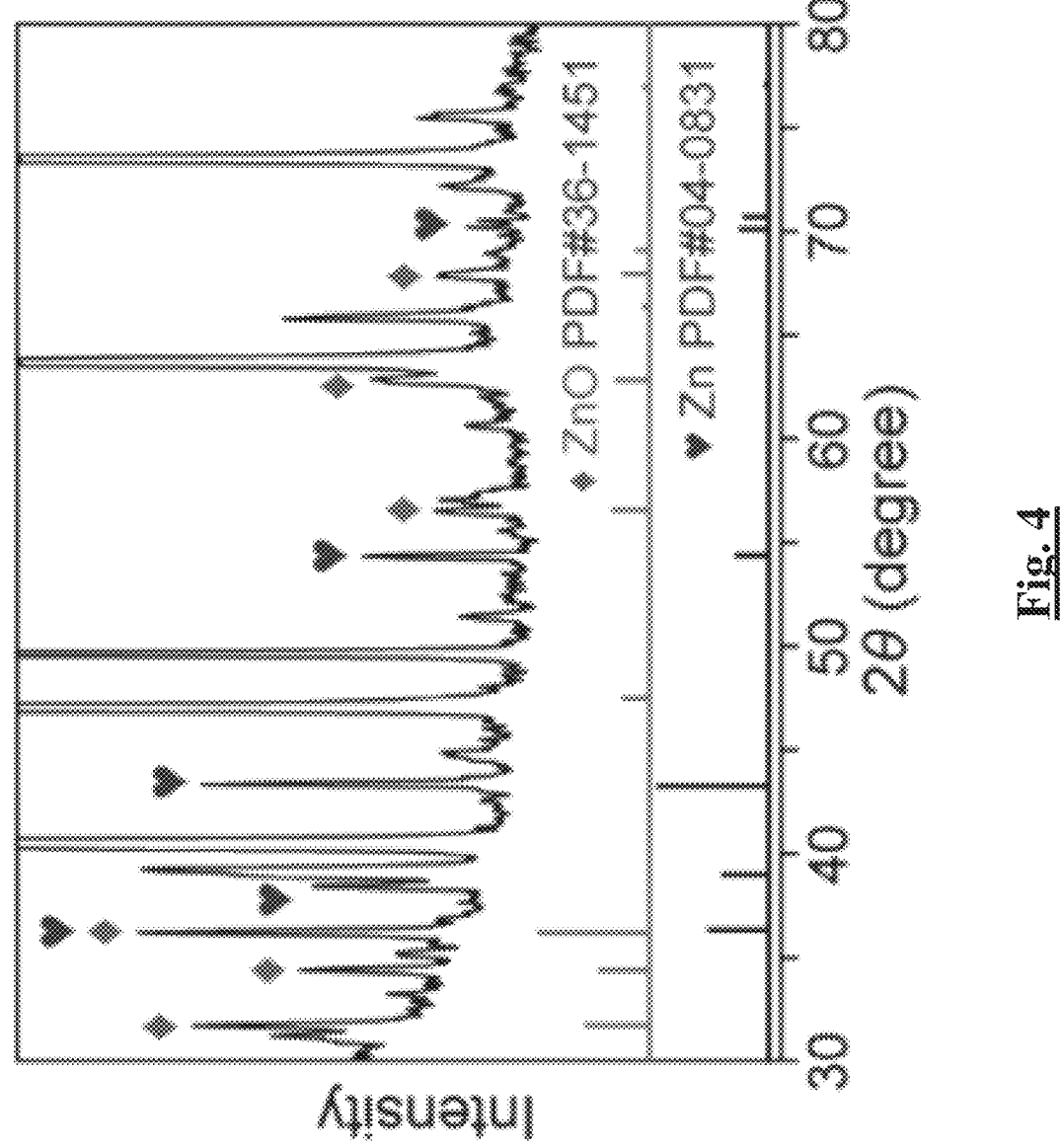
FIG. 4 shows XRD pattern of the by-product collected from the alumina adiabatic plug at the outlet side of the quartz tube furnace of FIG. 1.
Figure 5:
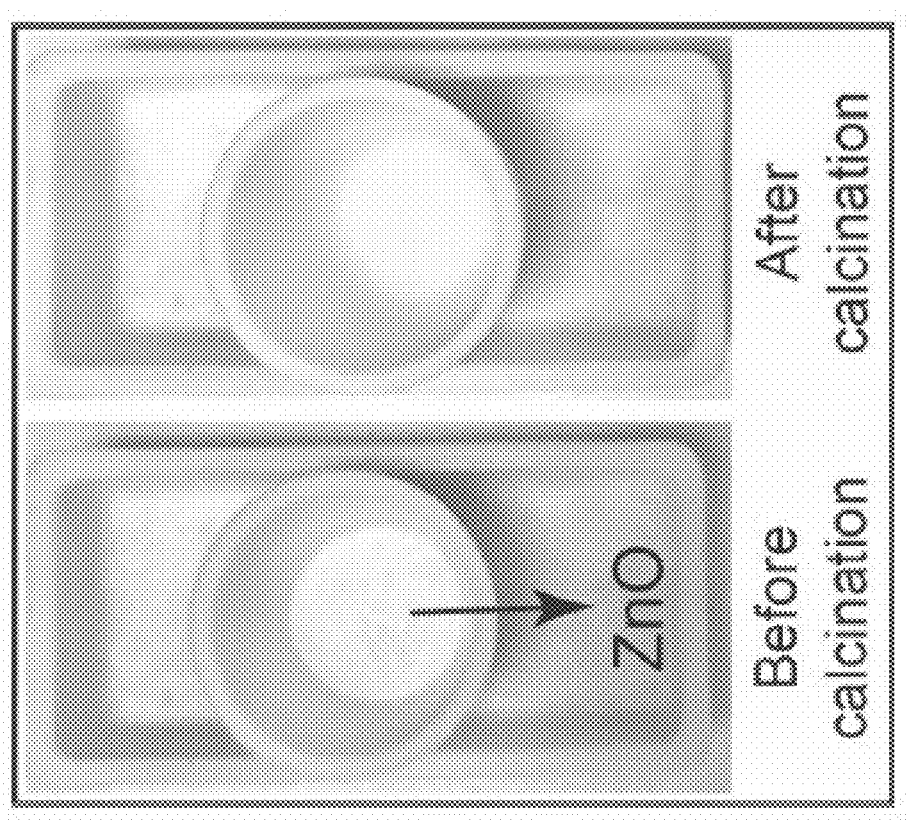
FIG. 5 shows calcination of pure ZnO in the $N_2/H_2$ mixture atmosphere at 1,200° C. for 1 hour.

The reaction mechanism proposed above was supported by detecting metallic Zn in the by-product collected from the surface of the alumina adiabatic plug at the outlet side of the quartz tube furnace 10, as shown in FIG. 4. The transformation of ZnO into Zn and H$_2$O under the N$_2$/H$_2$ mixture atmosphere was further verified by observing the complete volatilization of solid ZnO upon heating at 1,200° C. (see FIG. 5, in which no ZnSe or ZnS product was found after calcination). The ZnO component detected in the residue (as per FIG. 4) was probably formed because of partial oxidation of the Zn element as the evaporated by-products flew toward the outlet of the quartz tube furnace 10.

Figure 6:
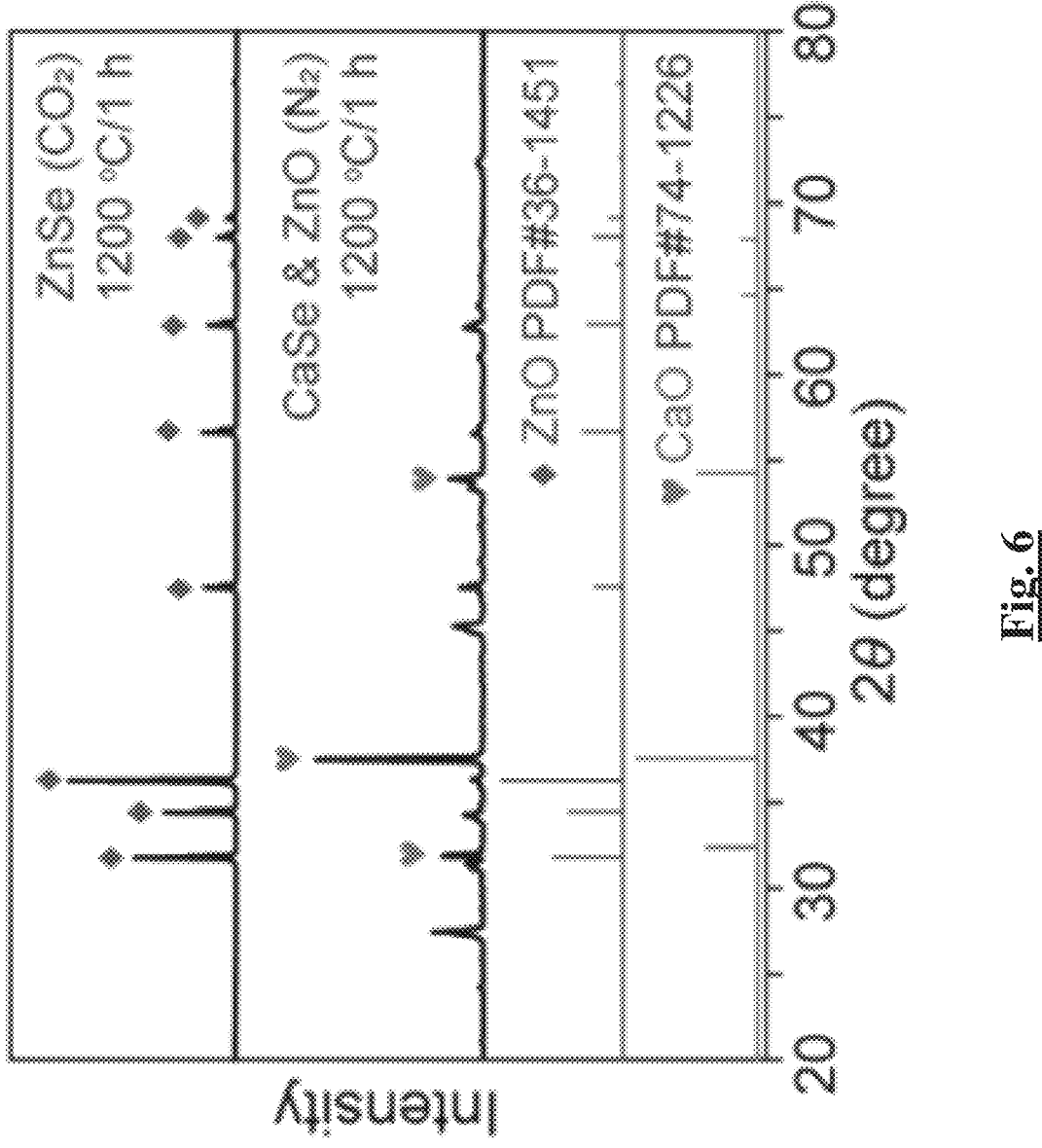
FIG. 6 shows XRD patterns of ZnSe calcined at 1,200° C. for 1 hour under $CO_2$ (top panel) and $N_2$ with ZnO (bottom panel)

In addition to facilitating the removal of ZnO by-product, the H$_2$ component in the reaction atmosphere is also essential for enabling the synthesis. In the absence of H$_2$, ZnSe tends to oxidize into ZnO due to CO$_2$ evolved from CaCO$_3$ (see FIG. 6, top panel), thereby suppressing the reaction at the source. H$_2$ also pushes the displacement reaction (Equation 2) forward by continuously removing ZnO by-products from the system. Control experiments showed that CaSe could be converted back into CaO upon reacting with ZnO in the N$_2$ atmosphere at 1,200° C. (see FIG. 6, bottom panel).

Figure 7:
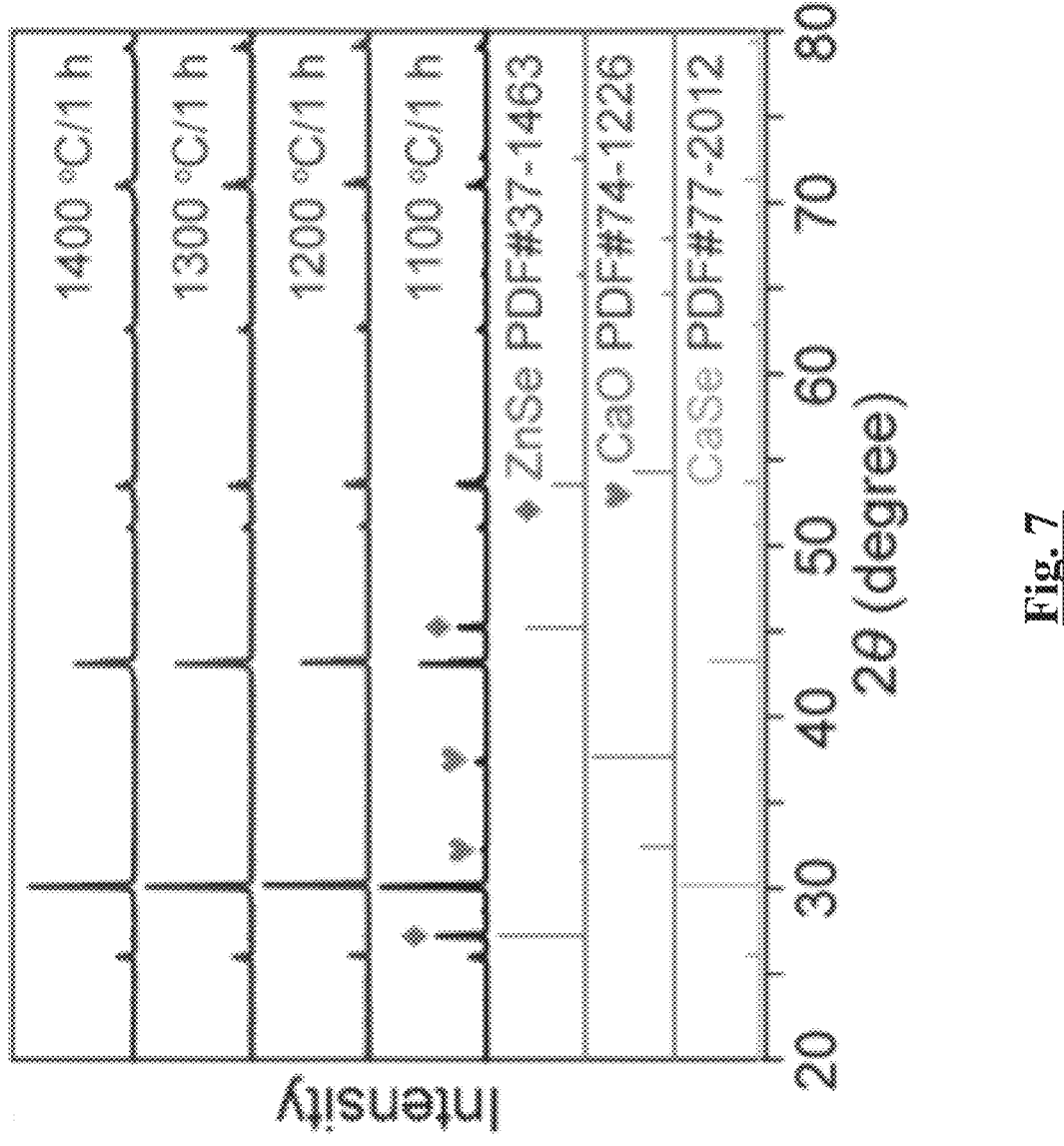
FIG. 7 shows XRD patterns of the products synthesized at different temperatures in the $N_2/H_2$ mixture atmosphere for 1 hour according to a method of the present invention.
Figure 8:
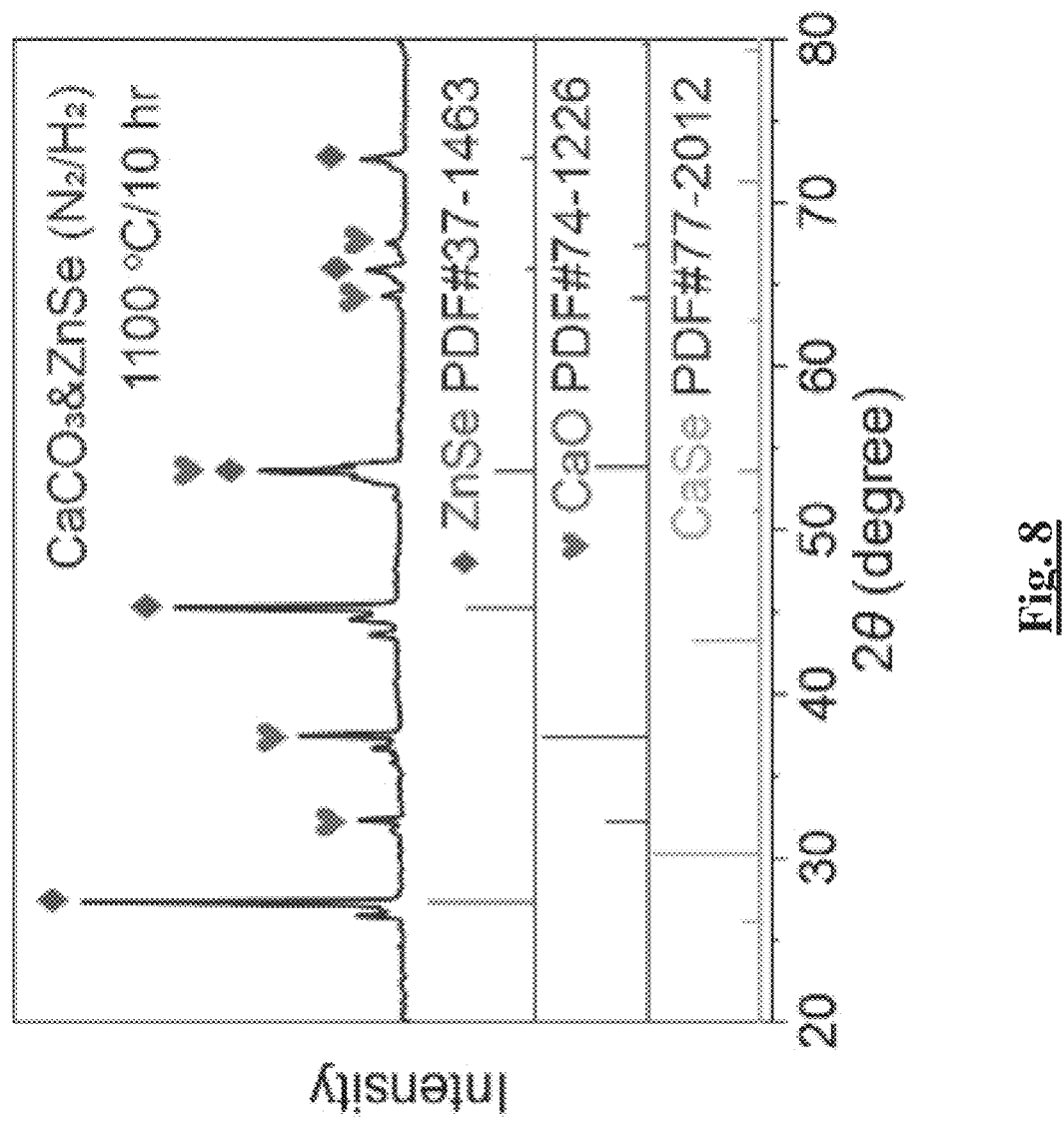
FIG. 8 is a XRD pattern of CaSe sample synthesized at 1,100° C. in the $N_2/H_2$ mixture atmosphere for 10 hours according to a method of the present invention.
Figure 9:
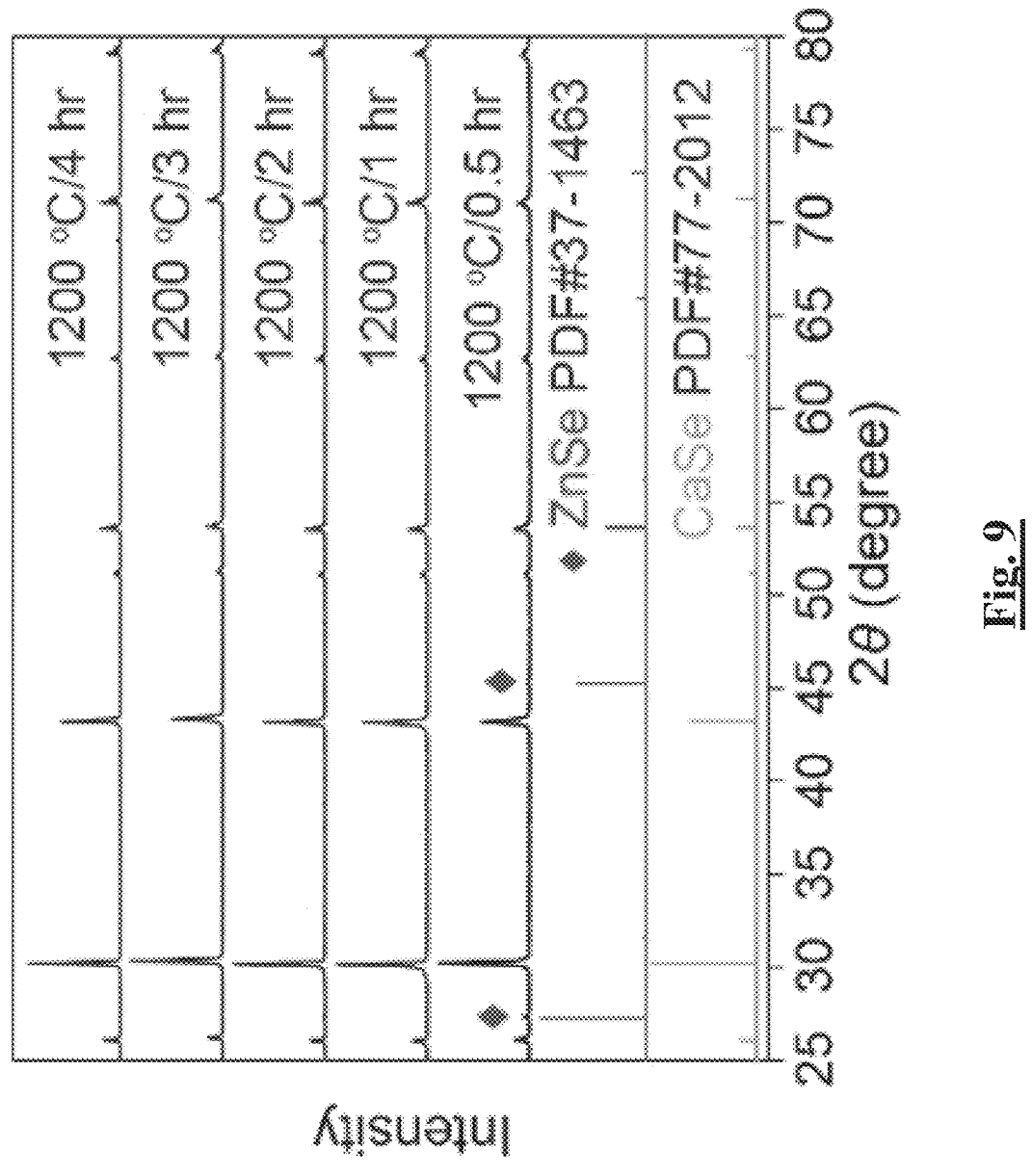
FIG. 9 are XRD patterns of CaSe samples synthesized at 1,200° C. for different reaction time durations in the $N_2/H_2$ mixture atmosphere according to a method of the present invention.

The temperature and time effects on the reaction have been investigated. According to the XRD characterizations (as per FIG. 7), pure-phase CaSe crystals were obtained in a wide temperature range of 1,200-1,400° C., indicating the high thermal stability of the product. As the reaction temperature dropped to 1,100° C., heterogeneous phases comprising ZnSe and CaO impurities were detected because of the incomplete reaction. Notably, the ZnSe and CaO impurities can hardly be eliminated by prolonging the reaction time to 10 hours (as per FIG. 8), suggesting that a relatively high temperature is indispensable to facilitate the displacement reaction. It is worth noting that short calcination time (<0.5 hour) at 1,200° C. would also lead to incomplete reactions. However, extended calcination for an overlong period of time (>4 hours) could result in softening of the product, making it difficult to collect after cooling, as per FIG. 9.

Figure 10:
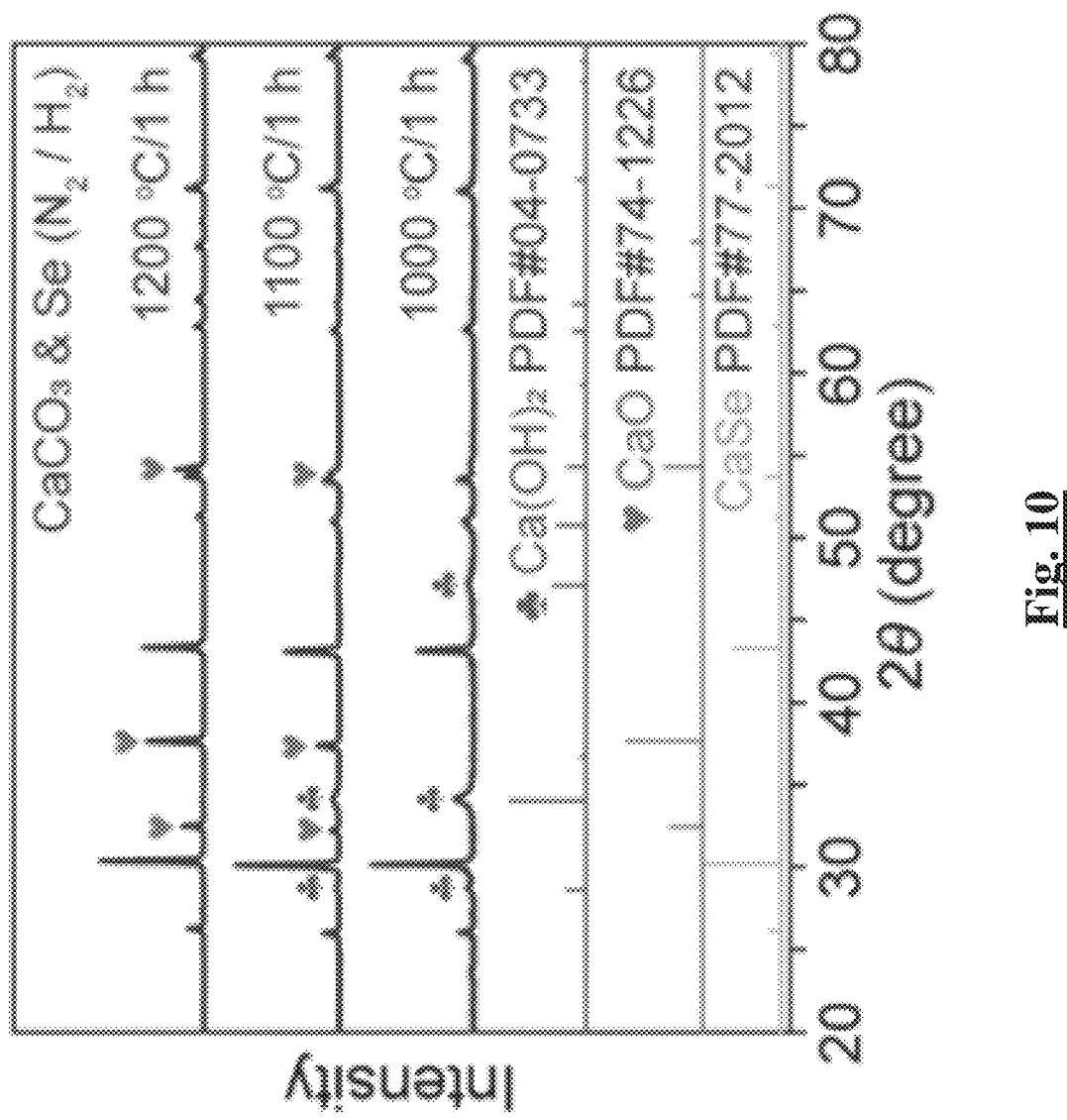
FIG. 10 shows XRD patterns of the products synthesized using Se powder as the raw material at different temperatures in the $N_2/H_2$ mixture atmosphere for 1 hour according to a method of the present invention.
Figure 11:
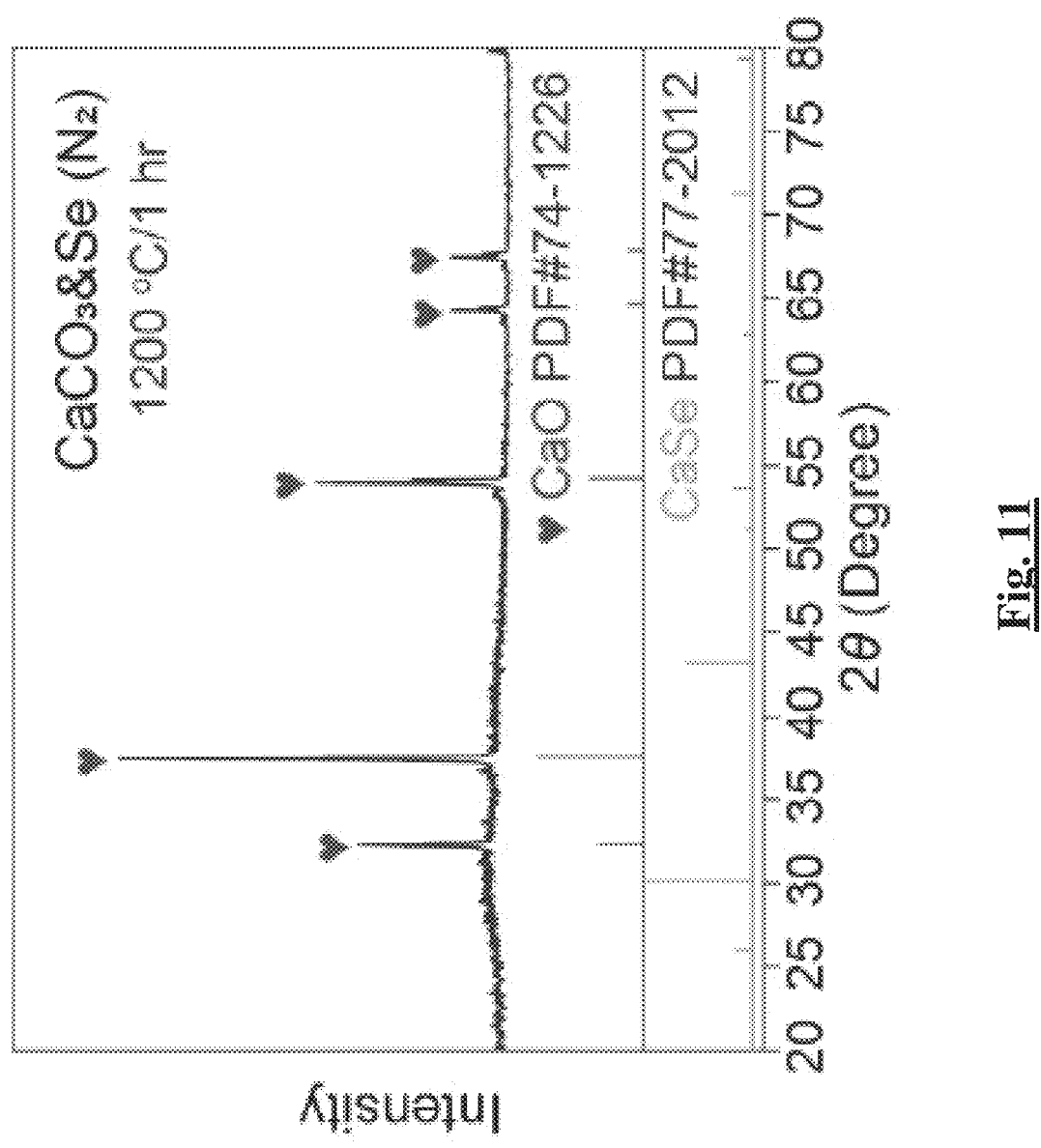
FIG. 11 is an XDR pattern of the products synthesized using Se powder as the raw material at different temperatures in the $N_2$ atmosphere for 1 hour.

The selection of selenium source is also important for the synthesis. By calcining CaCO$_3$ with pure Se powder at different temperatures for 1 hour with other conditions kept constant, significant amounts of oxide and hydroxide by-products (such as Ca(OH)$_2$ and CaO) emerged according to the XRD patterns (see FIG. 10). The occurrence of such by-products was ascribed to incomplete displacement reactions caused by evaporation loss of the Se precursors, stemming from the low boiling temperature of Se power (~685° C.). Notably, when CaCO$_3$ and Se powder were calcined in pure N$_2$ atmosphere, the final product was dominated by CaO with no detectable CaSe, see FIG. 11. The results suggest that H$_2$ plays an essential role in initiating this selenization process by reducing monomeric Se to Se$^{2-}$ ions.

Figure 12:
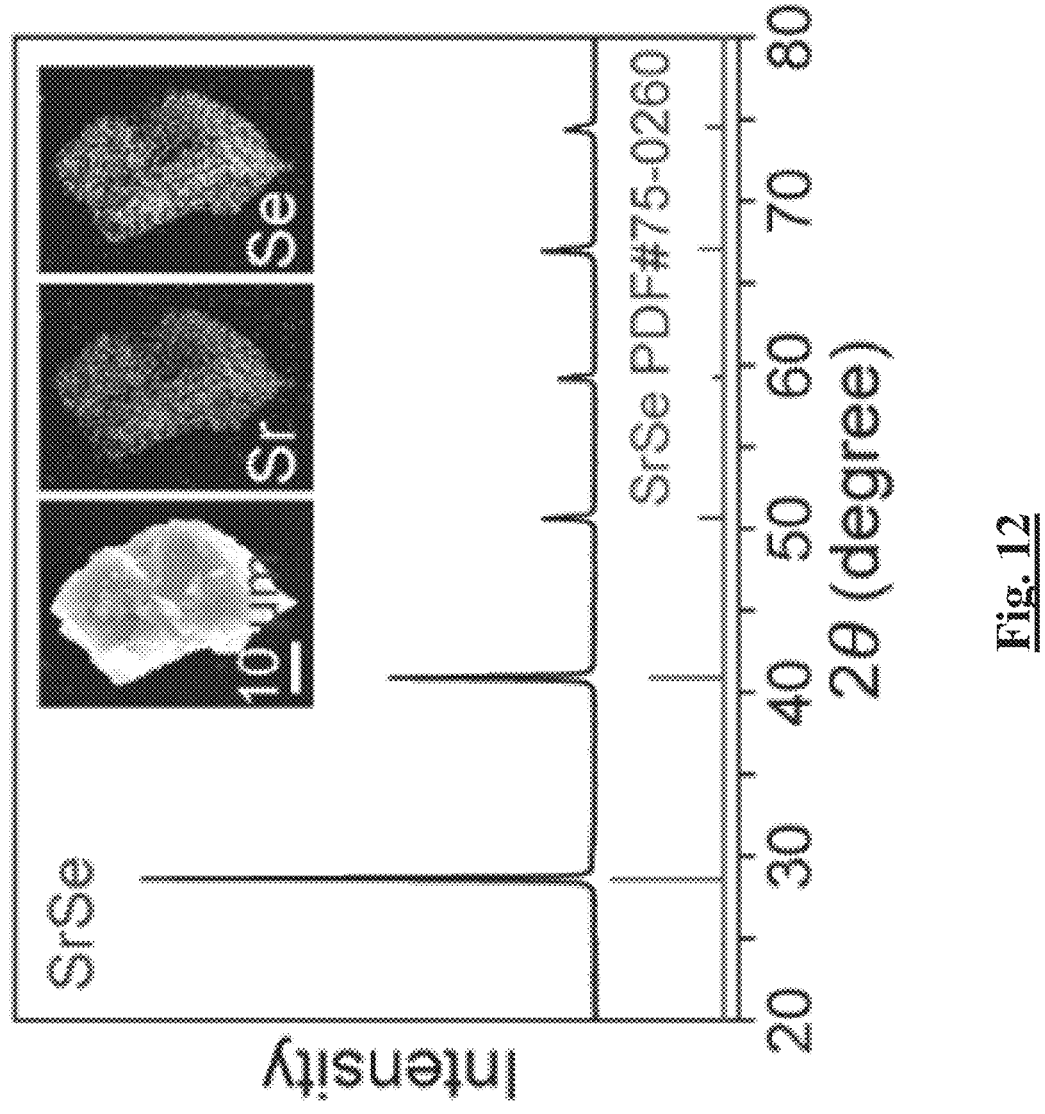
FIG. 12 shows XRD pattern of SrSe crystals synthesized at 1,000° C. for 1 hour in the $N_2/H_2$ mixture atmosphere according to a method of the present invention, in which the insets show SEM images and related EDX elemental mapping of randomly selected SrSe particles.
Figure 13:
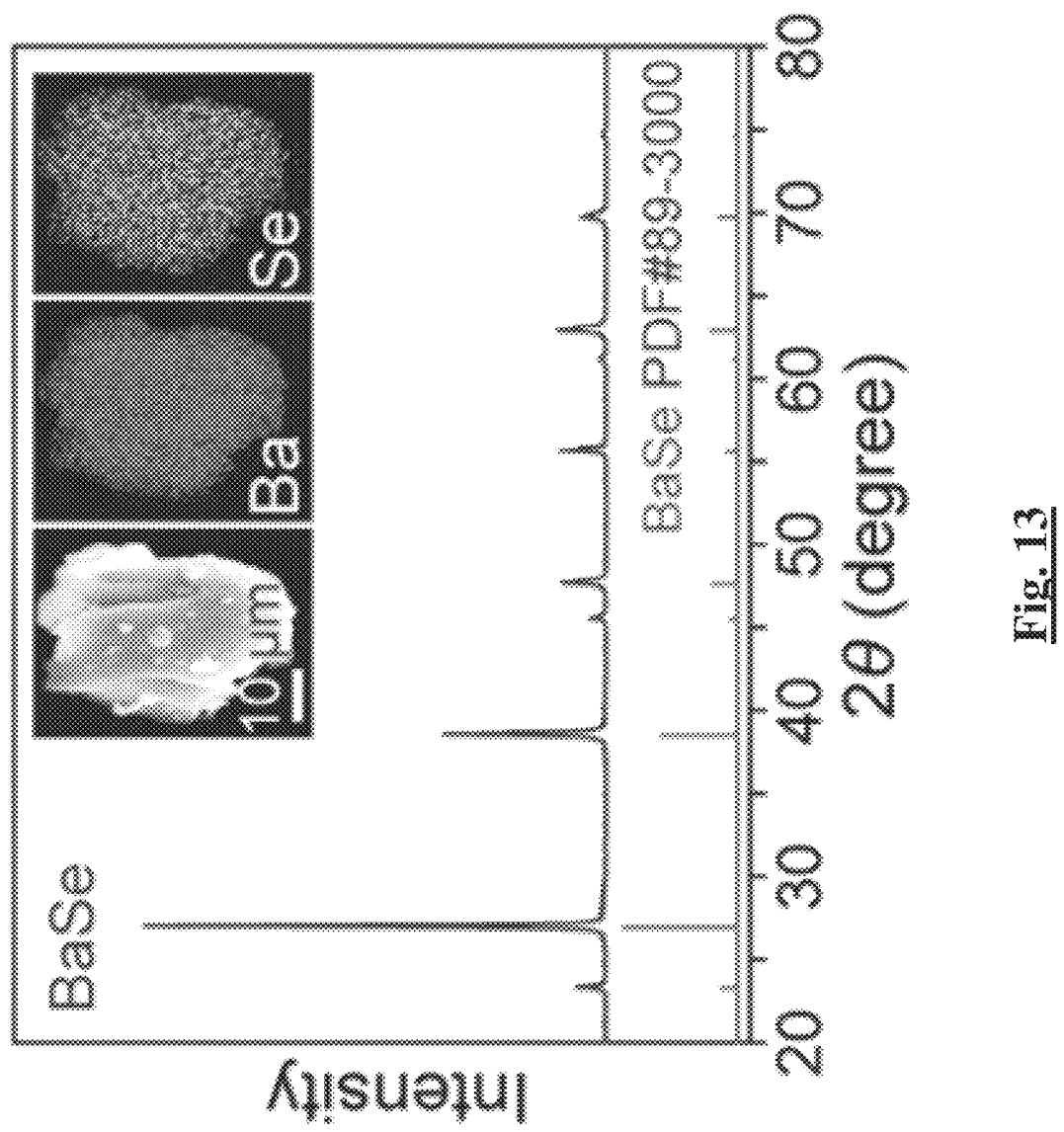
FIG. 13 shows XRD pattern of BaSe crystals synthesized at 1,000° C. for 1 hour in the $N_2/H_2$ mixture atmosphere according to a method of the present invention, in which the insets show SEM images and related EDX elemental mapping of randomly selected BaSe particles.
Figure 14:
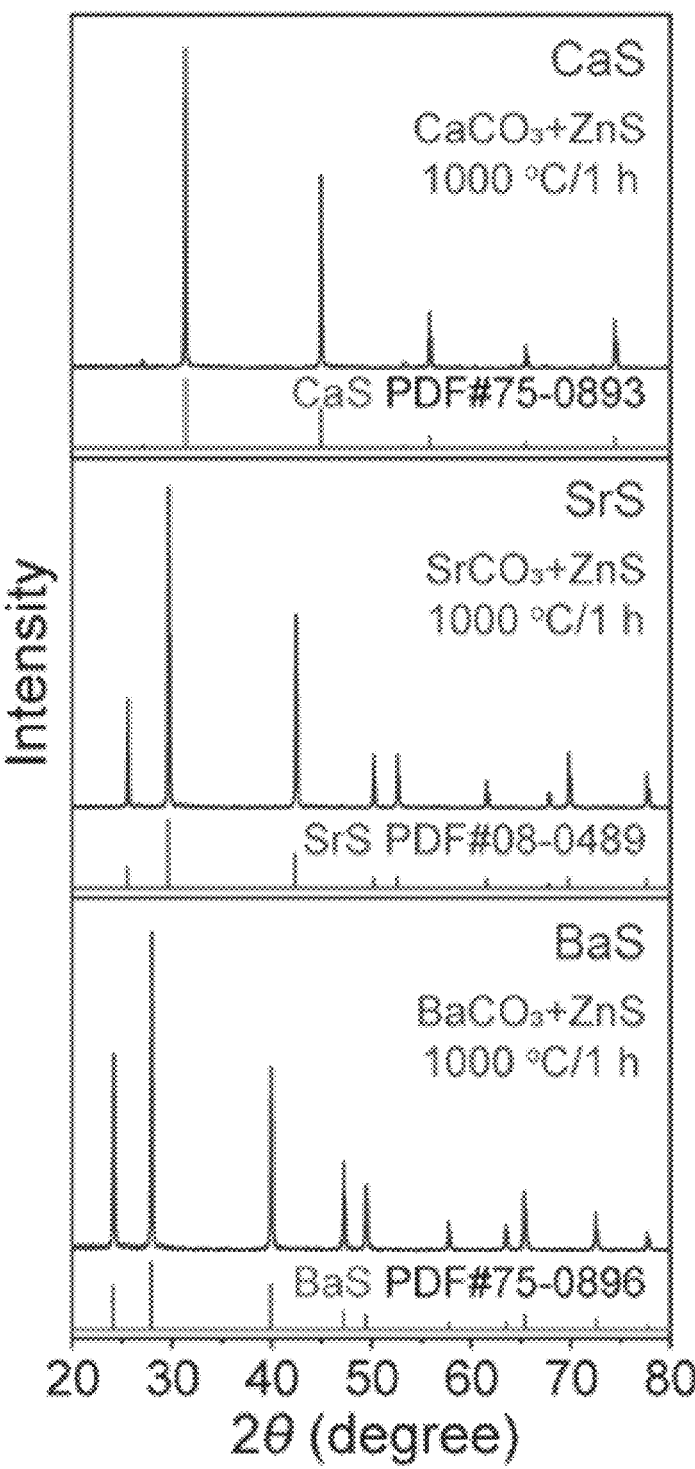
FIG. 14 shows respective XRD patterns of CaS, SrS, and BaS samples synthesized at 1,000° C. for 1 hour in the $N_2/H_2$ mixture atmosphere according to a method of the present invention.
Figure 15:
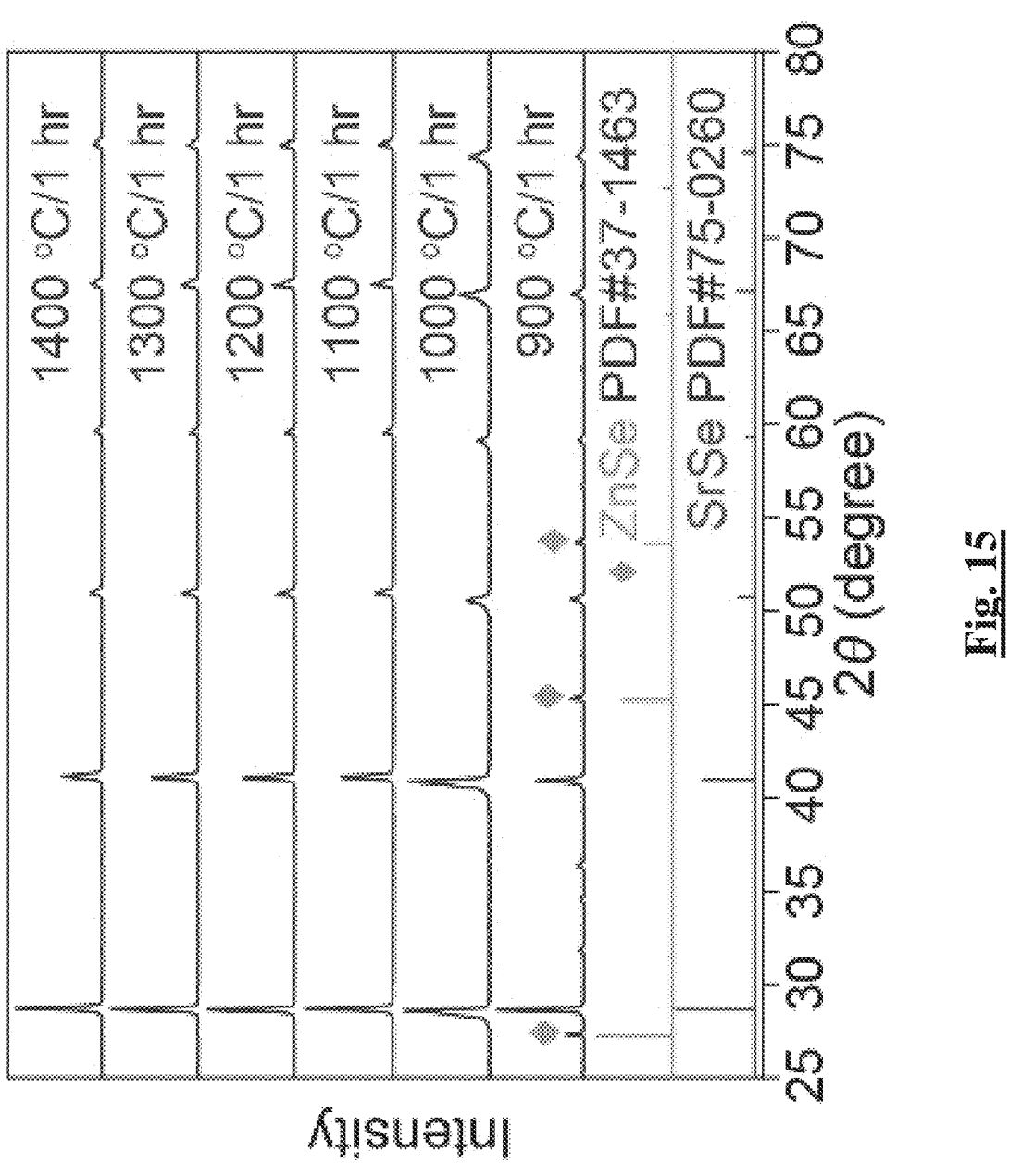
FIGS. 15 and 16 are XRD patterns of SrSe samples synthesized at different reaction time durations and temperatures in the $N_2/H_2$ mixture atmosphere.
Figure 16:
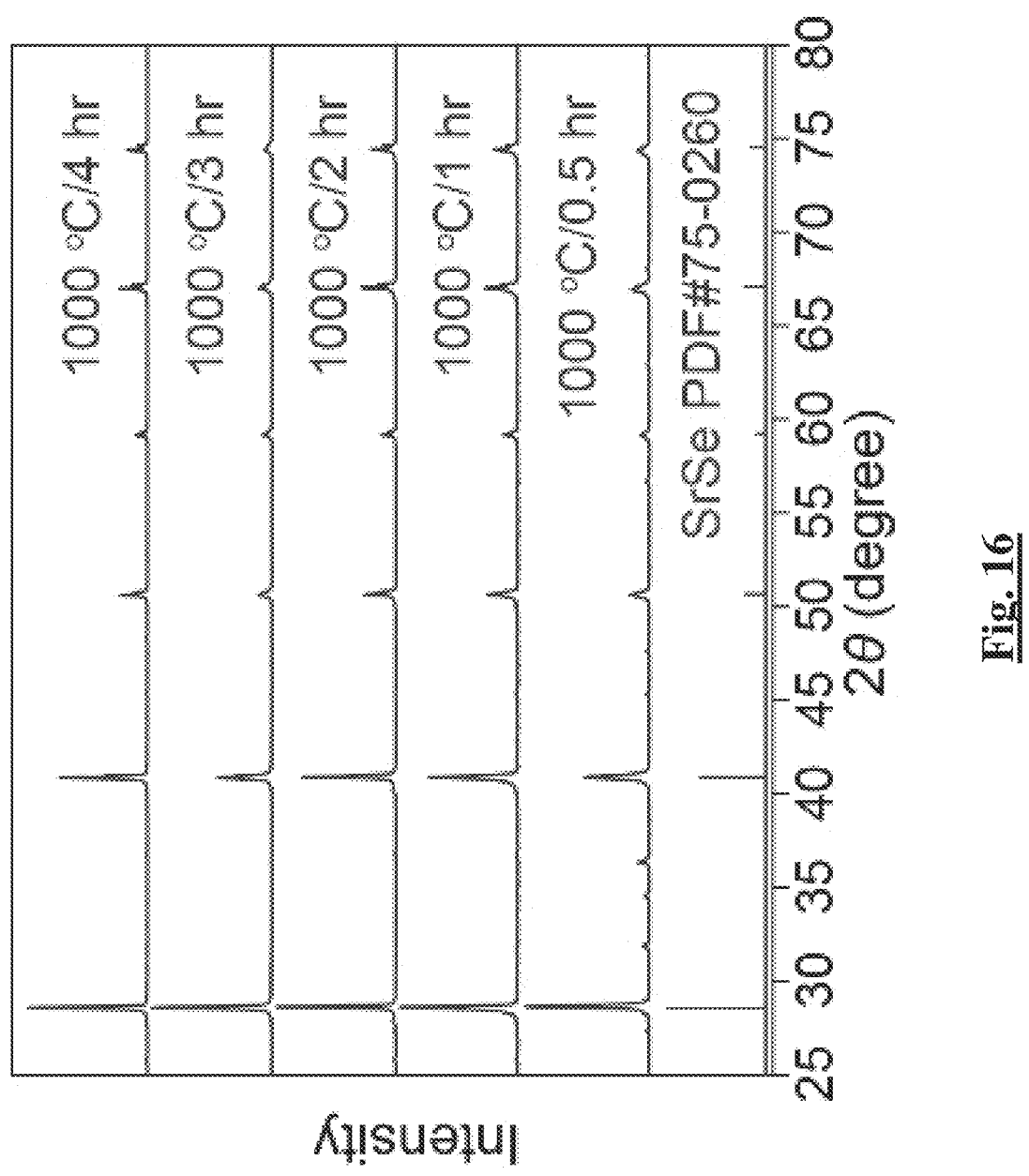
Figure 17:
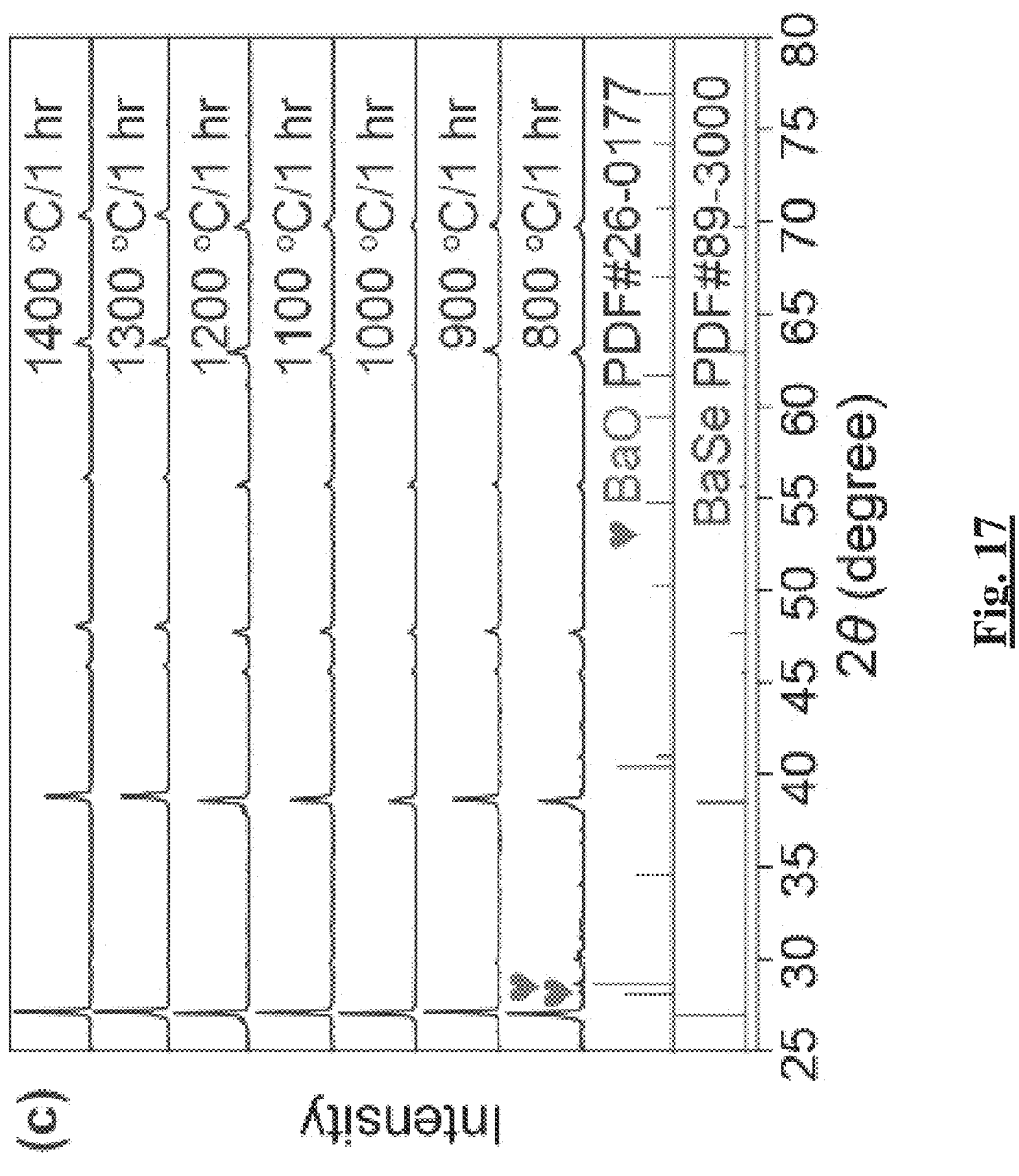
FIGS. 17 and 18 are XRD patterns of BaSe samples synthesized at different reaction time durations and temperatures in the $N_2/H_2$ mixture atmosphere.
Figure 18:
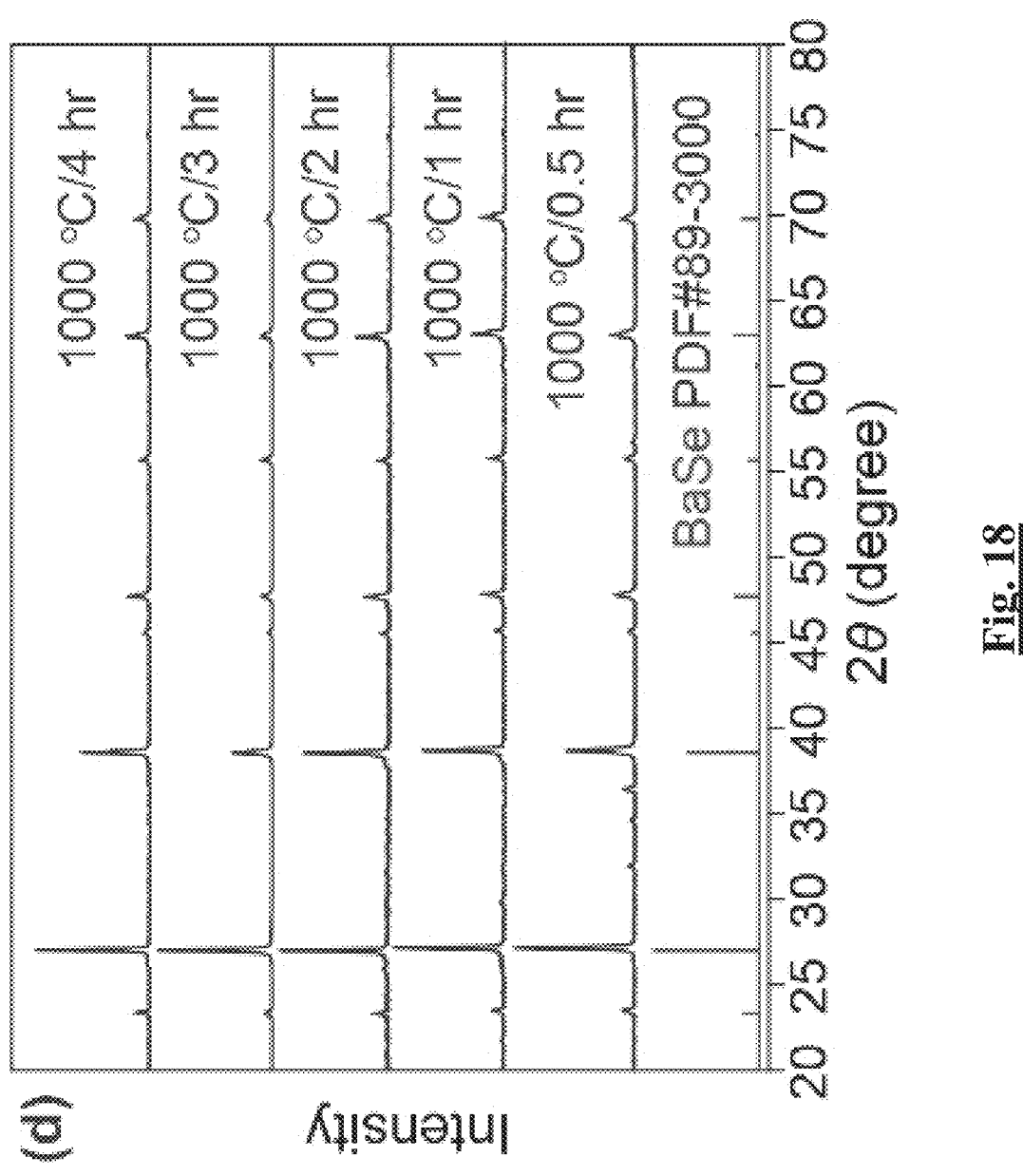
Figures 19, 20:
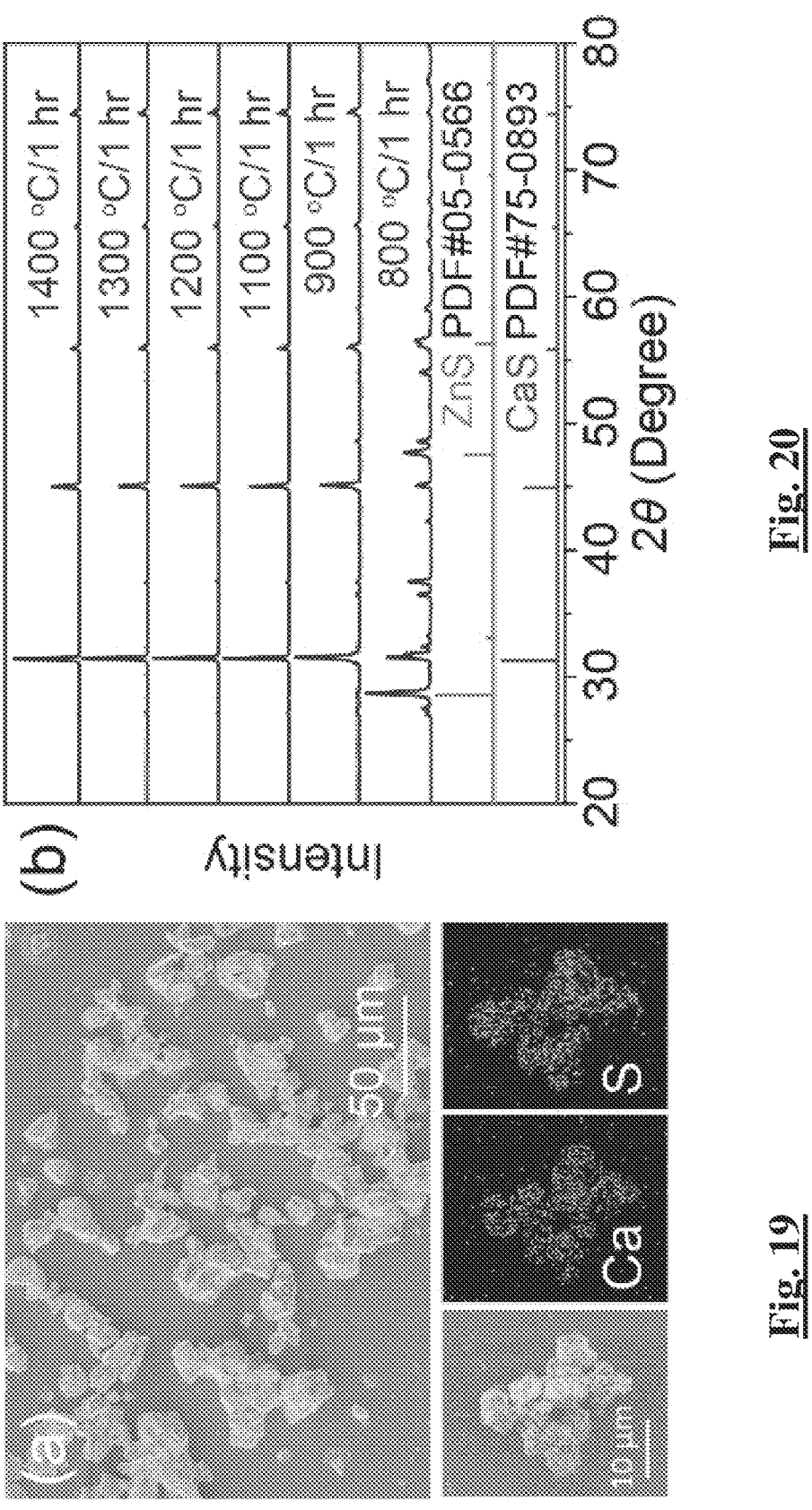
FIGS. 19 and 20 are SEM images with related EDX mapping and XRD patterns of CaS samples synthesized at different temperatures for 1 hour in the $N_2/H_2$ mixture atmosphere according to a method of the present invention.
Figures 21, 22:
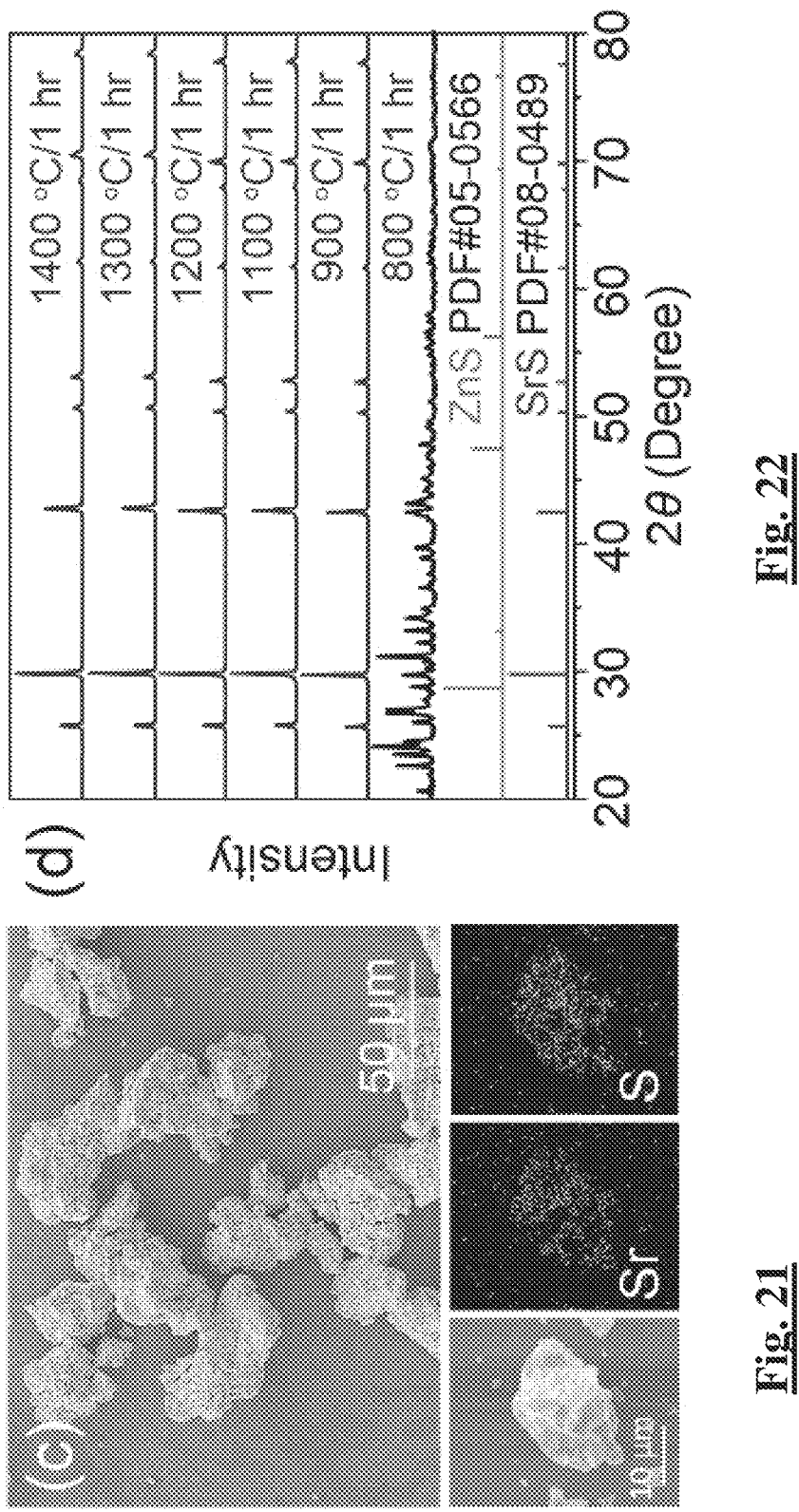
FIGS. 21 and 22 are SEM images with related EDX mapping and XRD patterns of SrS samples synthesized at different temperatures for 1 hour in the $N_2/H_2$ mixture atmosphere according to a method of the present invention.
Figures 23, 24:
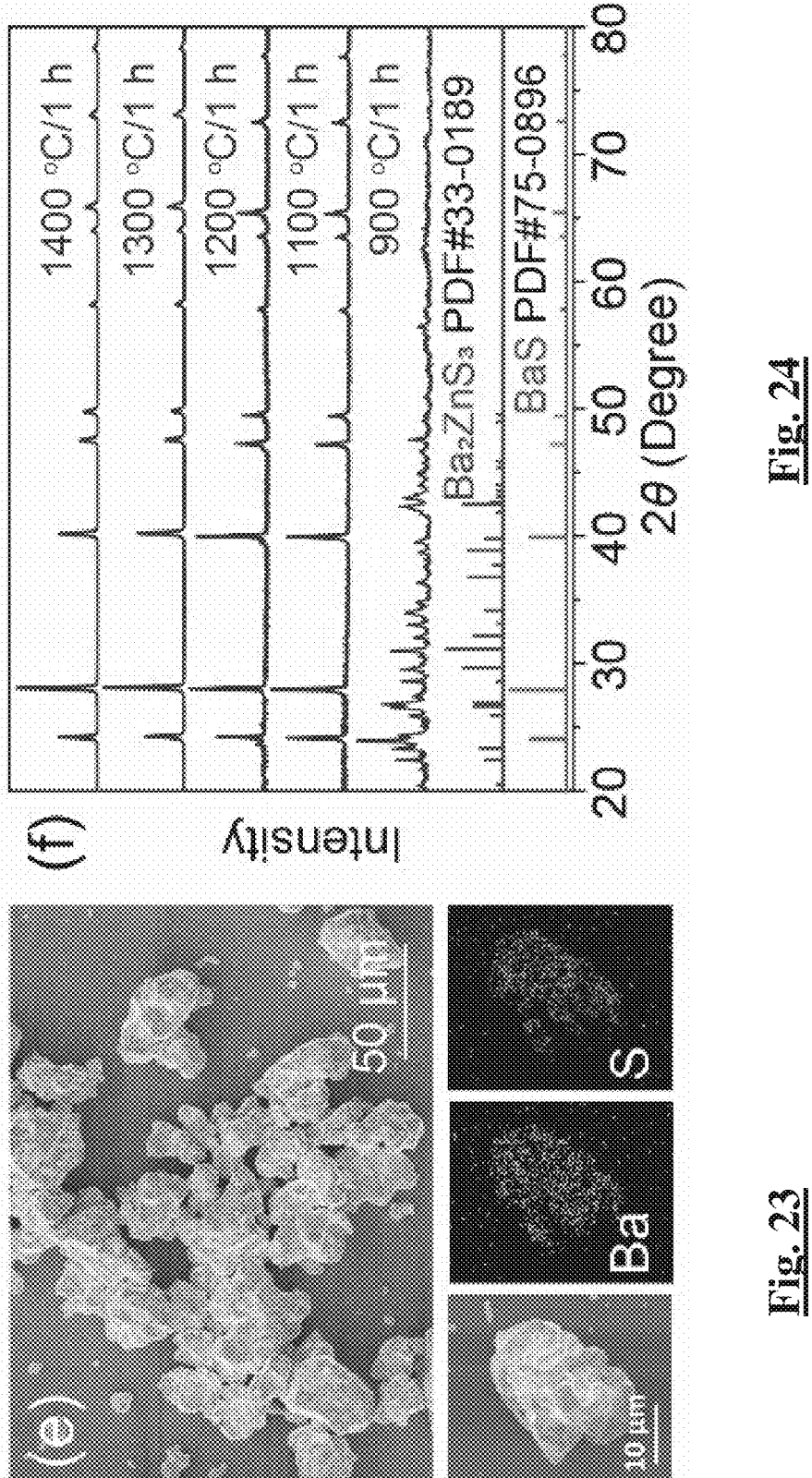
FIGS. 23 and 24 are SEM images with related EDX mapping and XRD patterns of BaS samples synthesized at different temperatures for 1 hour in the $N_2/H_2$ mixture atmosphere according to a method of the present invention.
Figures 25, 26:
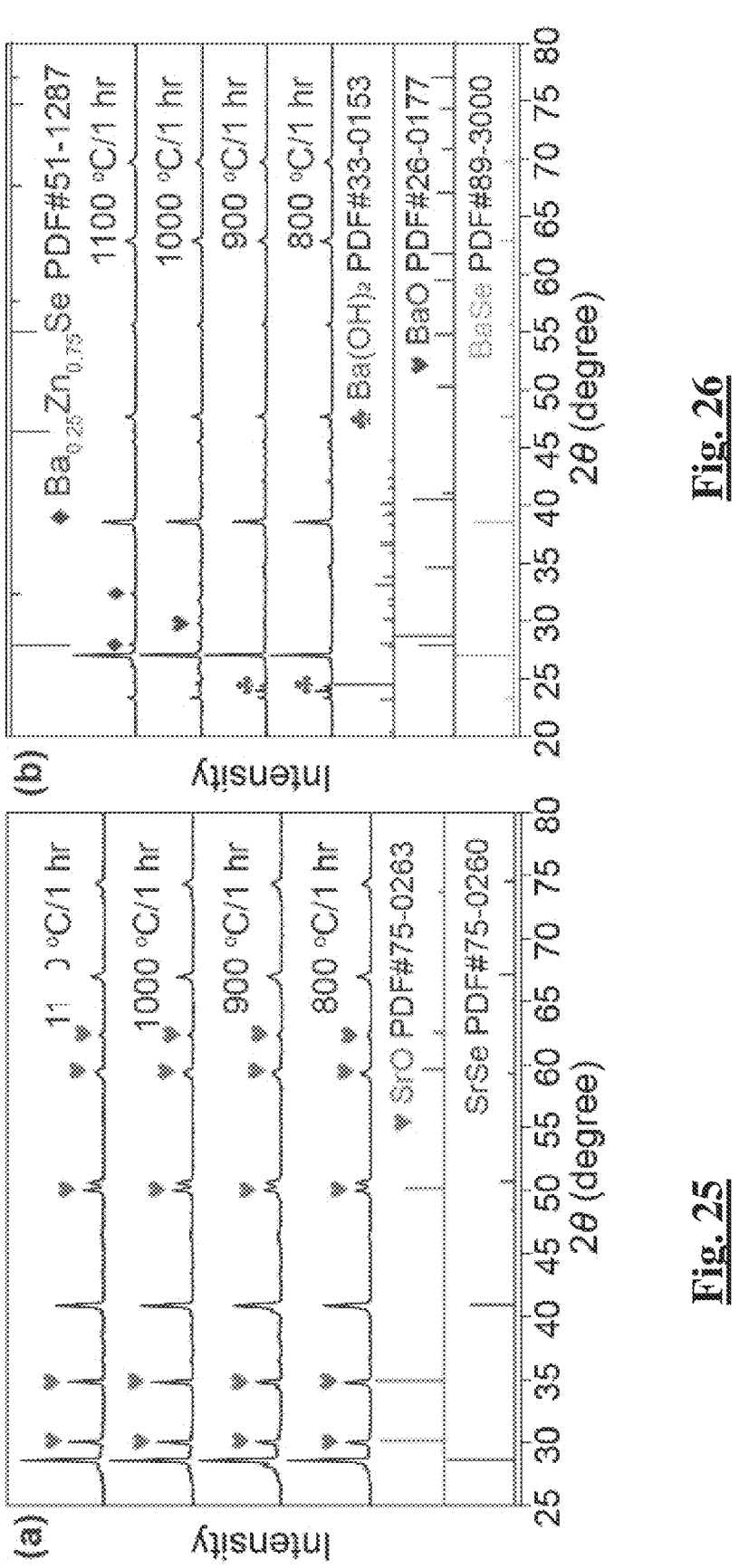
FIGS. 25 and 26 are XRD patterns of the products synthesized using pure Se powder as raw material at different temperatures for 1 hour in the $N_2/H_2$ mixture atmosphere according to a method of the present invention.
Figures 27, 28:
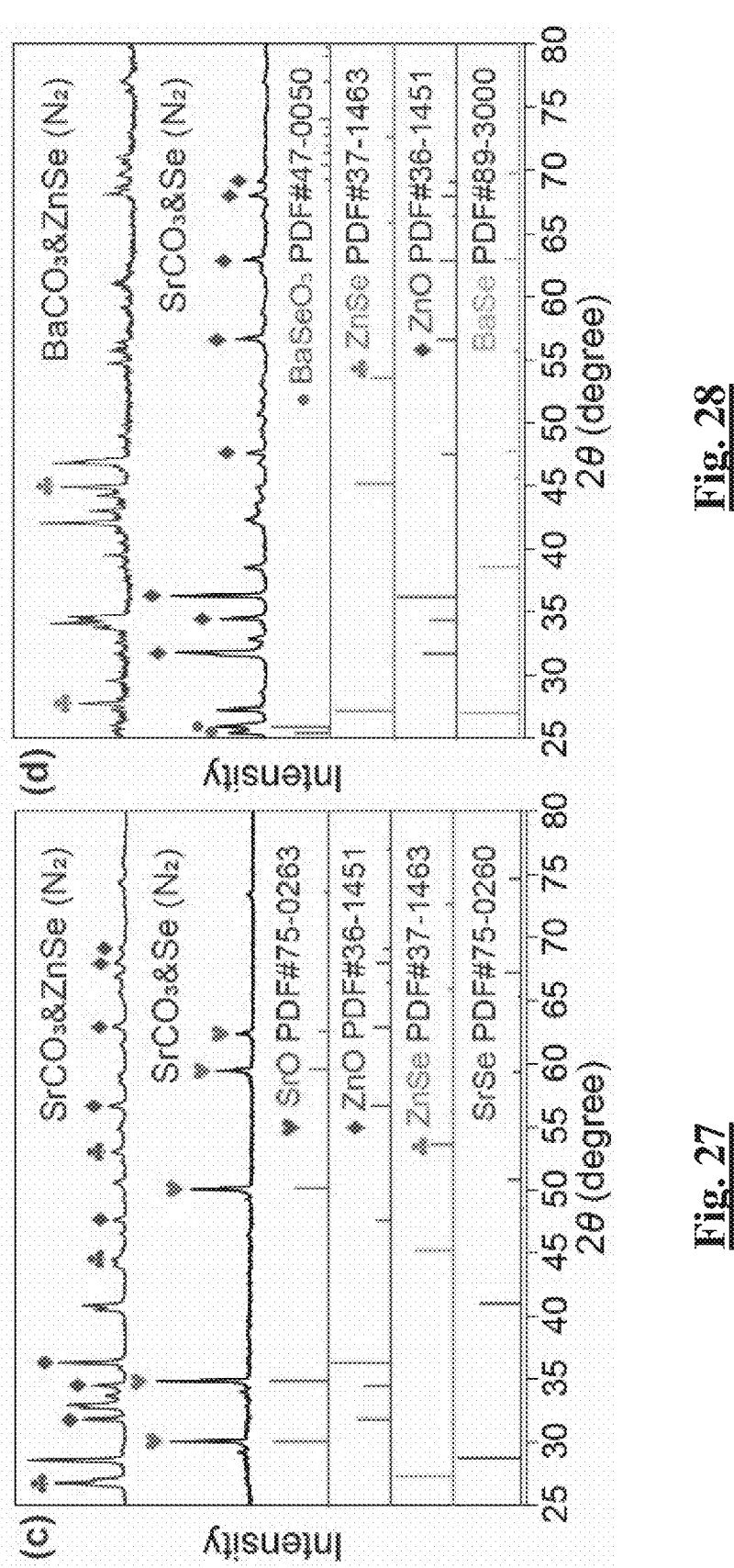
FIGS. 27 and 28 are XRD patterns of the products synthesized using pure Se powder and ZnSe as raw materials in $N_2$ atmosphere for 1 hour at 1,000° C., respectively.

The synthetic protocol was readily extended to prepare other types of AE chalcogenides. For example, by calcining SrCO$_3$ and BaCO$_3$ with ZnSe in the same way, pure cubic phase SrSe and BaSe were respectively obtained (see FIGS. 12 and 13). Furthermore, pure cubic phase CaS, SrS, and BaS were synthesized by calcining the relevant AE carbonates (CaCO$_3$, SrCO$_3$ and BaCO$_3$) with ZnS (see FIG. 14). Similar to the preparation of CaSe, these syntheses can all be accomplished over a large temperature range (around 1,000-1,400° C.) under the N$_2$/H$_2$ mixture atmosphere. If the reaction atmosphere or chalcogen source was changed, pure-phase AE chalcogenides could not be obtained.

FIGS. 15-18, 19-24 and 25-28 show XRD patterns, SEM images with related EDX mapping of SrSe, BaSe, CaS, SrS, BaS and other products synthesized in the N$_2$/H$_2$ mixture atmosphere according to a method of the present invention.

In further reactions, alloyed AE(S,Se) (e.g. Ca(S, Se)) crystals were synthesized by using mixture precursors of ZnSe and ZnS at controlled ratios, e.g. AECO$_3$ (such as CaCO$_3$) was mixed with ZnS/ZnSe mixtures at a ratio of 1:1, ground well in an agate mortar, and then calcined at different temperatures from 800 to 1,400° C. for 1 hour under an atmosphere consisting of a mixture of H$_2$ (10 vol %) in N$_2$. This compositional engineering permits precise control over the crystal field in the host lattice, which can be harnessed to tune the optical emission of impurity dopants such as luminescent ions, in particular luminescent lanthanide ions. Specifically, a series of CaS$_x$Se$_{(1-x)}$ (x=0, 0.2, 0.4, 0.6, 0.8, 1) crystals doped with 1% of europium (Eu$^{2+}$) were synthesized in a one-pot reaction by including EuF$_2$ in the precursor materials.

For the synthesis of AESe, AES, and AE(S,Se) doped with lanthanide ions (i.e., Eu$^{2+}$), the starting materials were weighed and homogeneously mixed in an agate mortar according to the stoichiometric ratios of AE0.99Se:Eu$^{2+}$ (1%), AE0.99S:Eu$^{2+}$ (1%) and AE0.99 (Se, S):Eu$^{2+}$ (1%).

Figure 29:
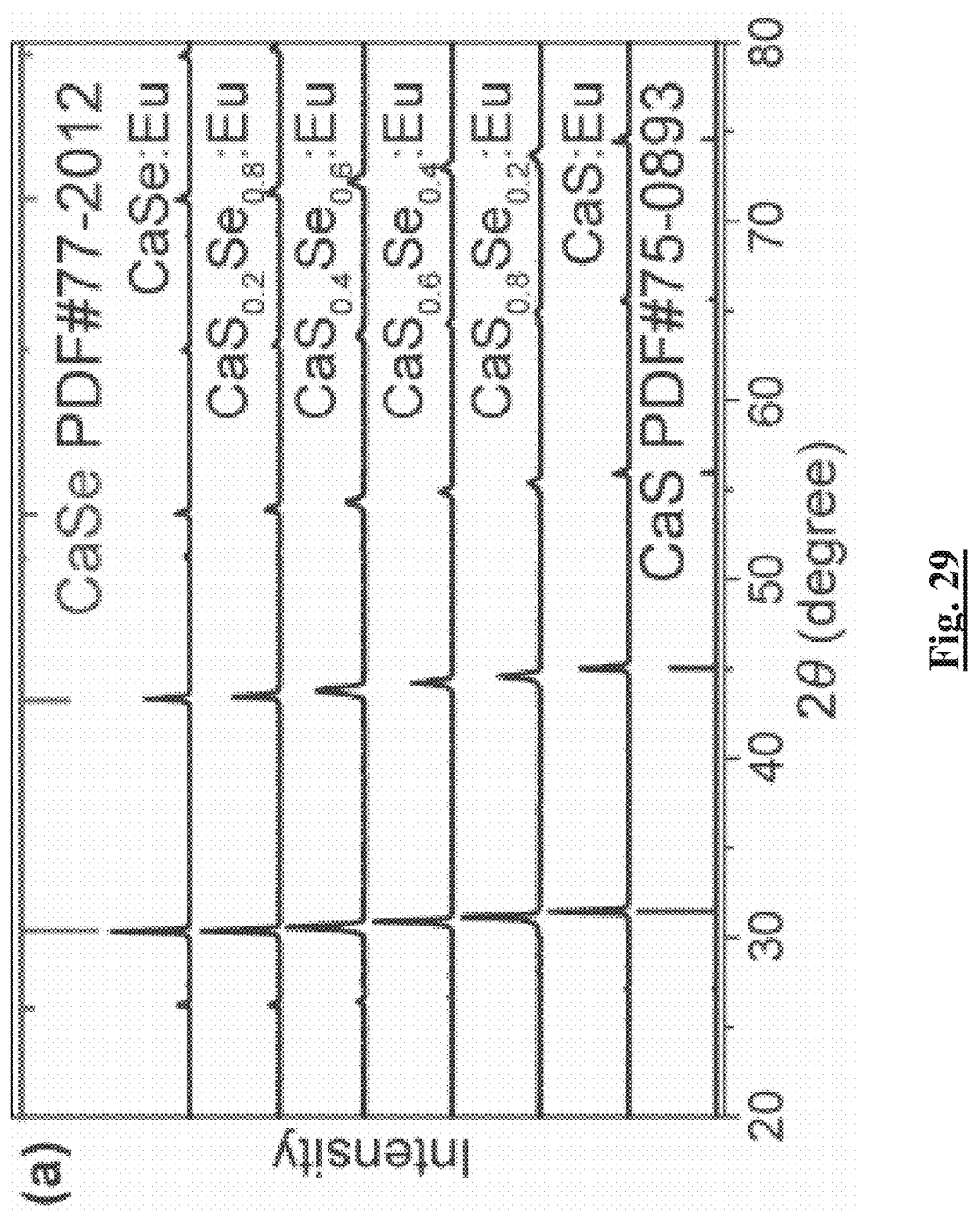
FIG. 29 show XRD patterns of $CaS_xSe_{(1-x)}:Eu^{2+}$ (1%, x=0, 0.2, 0.4, 0.6, 0.8, 1) crystals synthesized at 1,200° C. for 1 hour in the $N_2/H_2$ mixture atmosphere according to a method of the present invention.
Figure 30:
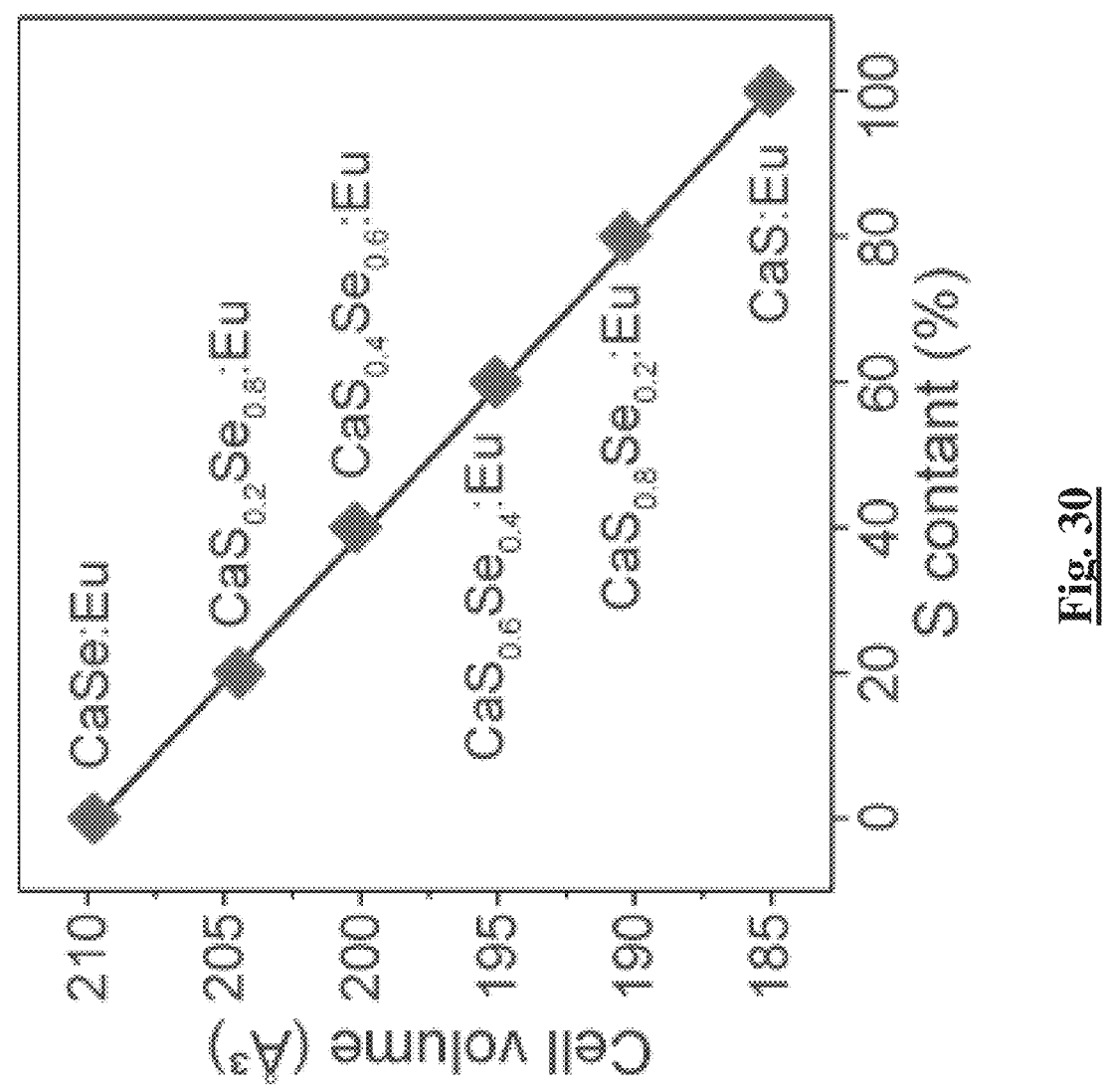
FIG. 30 shows the cell volume of the $CaS_xSe_{(1-x)}$ samples synthesized according to a method of the present invention as a function of x value derived from the XRD patterns.
Figures 31, 32:
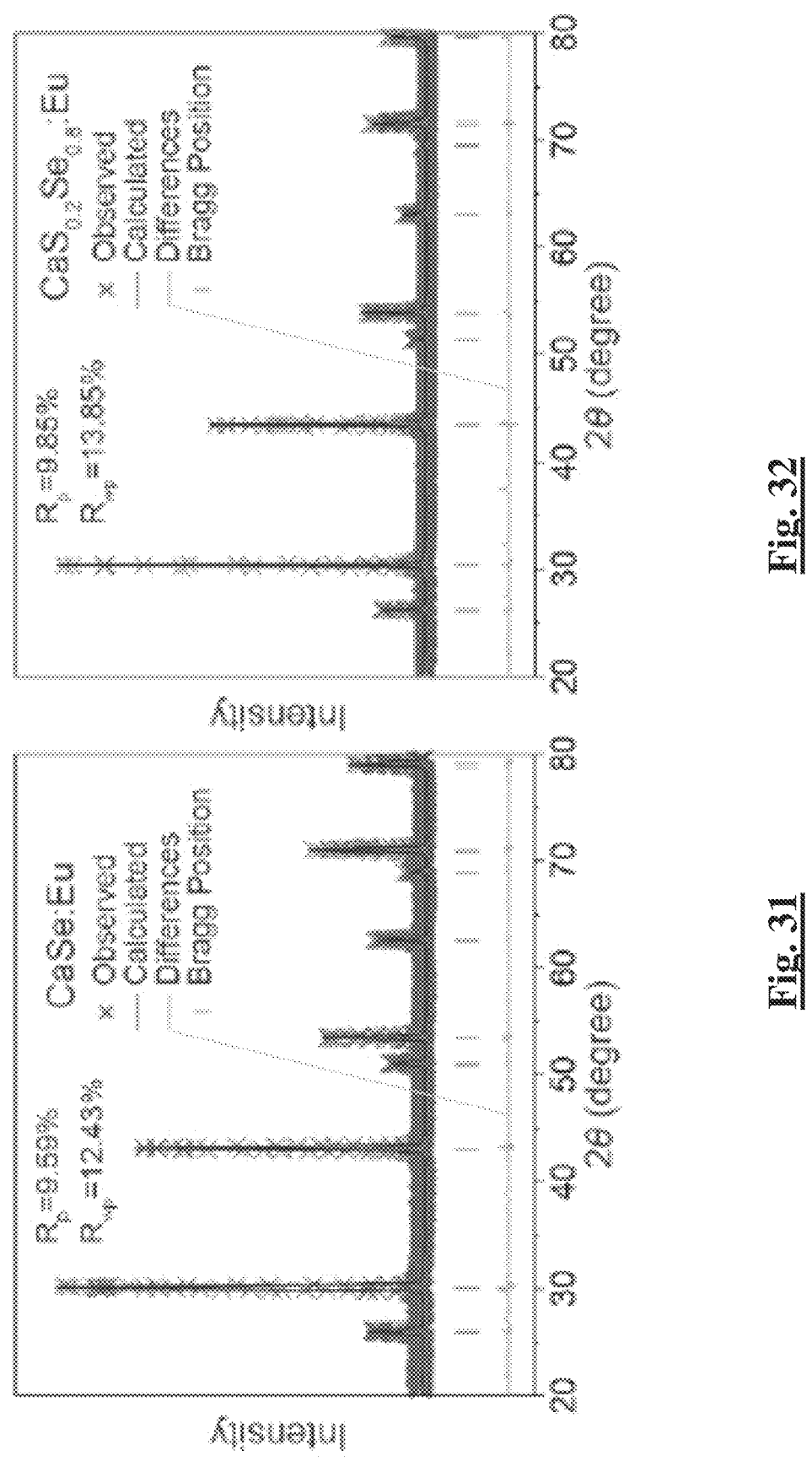
FIGS. 31, 32, 33, 34, 35, and 36 show Rietveld refinement of XRD patterns of $CaS_xSe_{(1-x)}:Eu^{2+}$ (1%, x=0, 0.2, 0.4, 0.6, 0.8, 1) crystals.
Figures 33, 34:
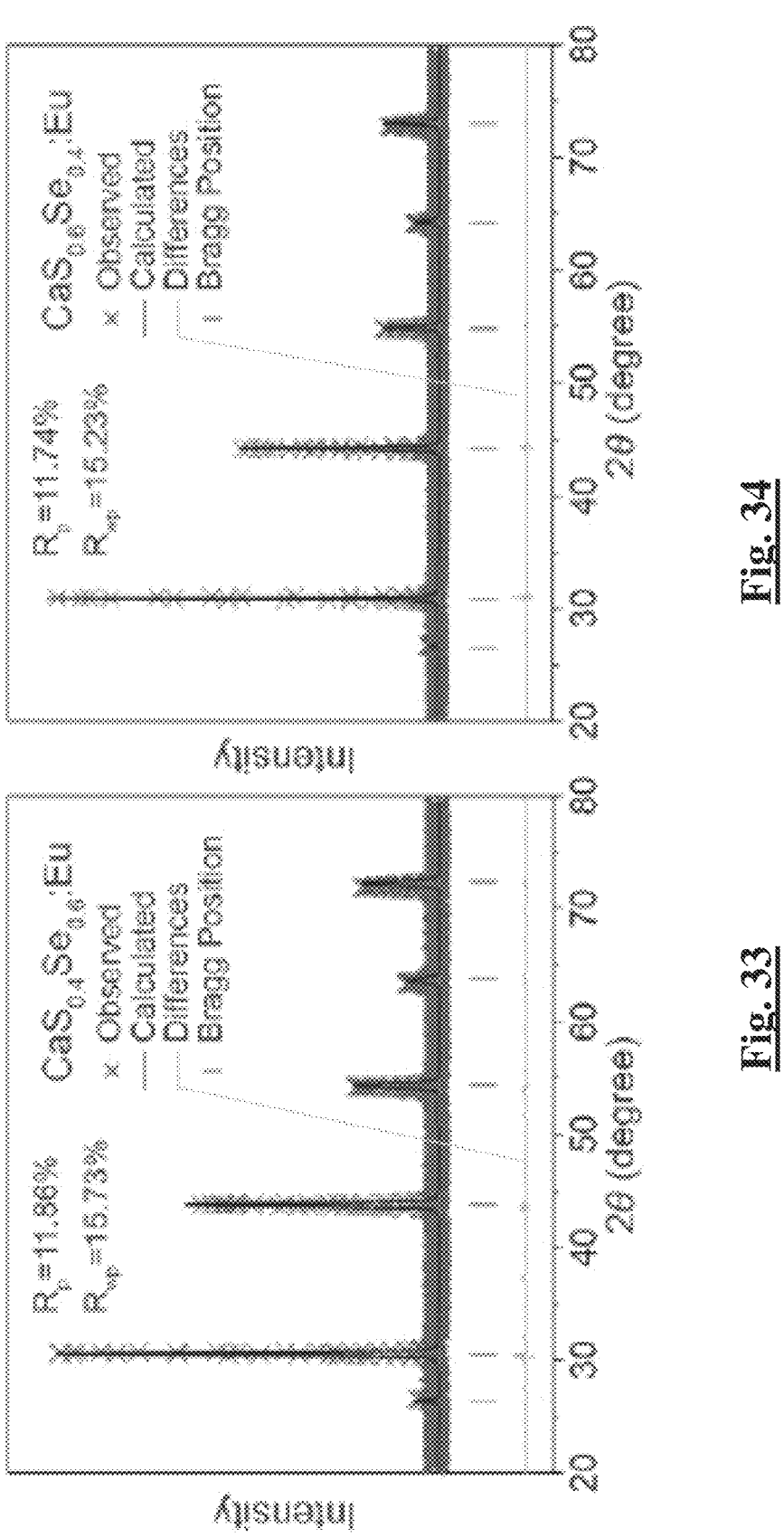
Figures 35, 36:
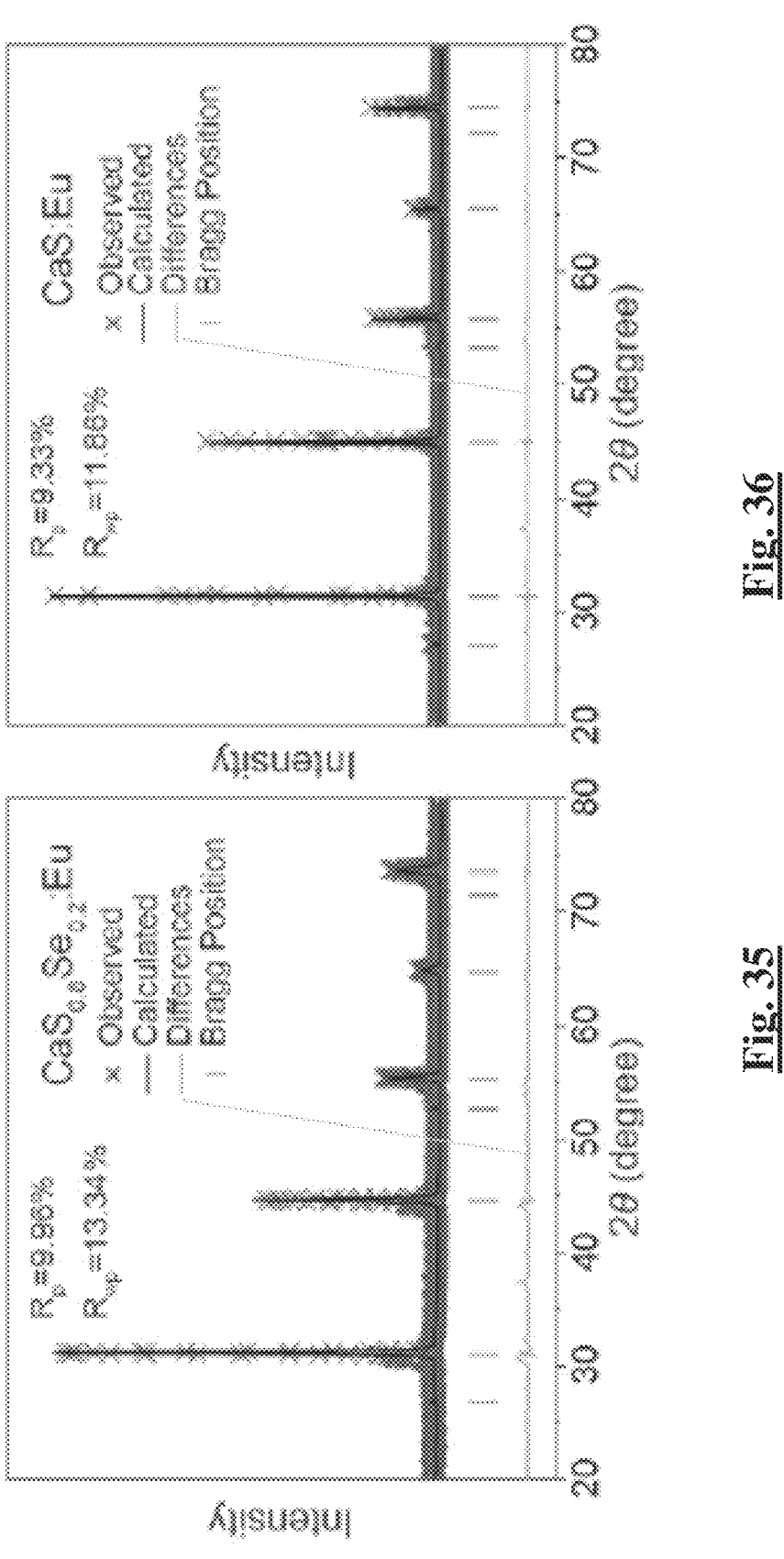
Figure 37:
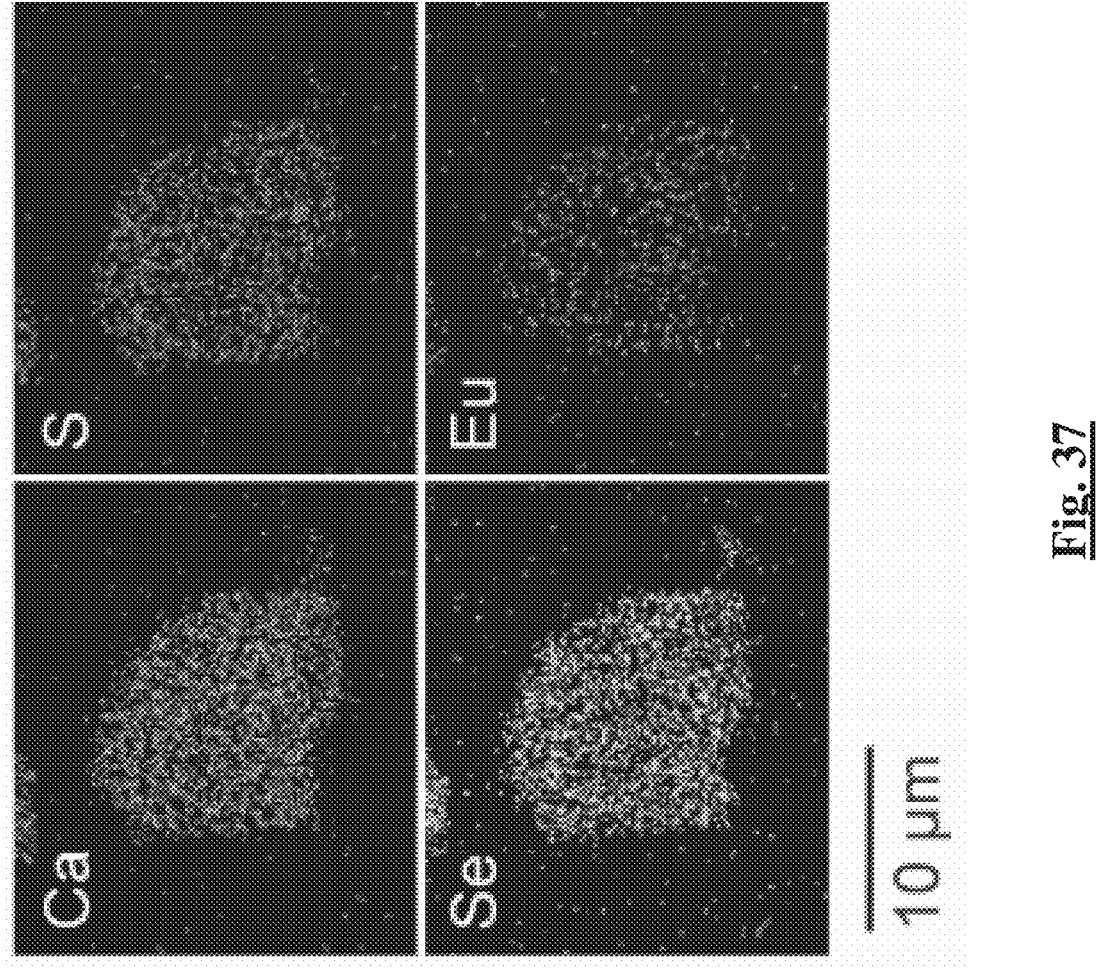
FIG. 37 shows EDX mapping of a typical particle composed of $CaS_{0.6}Se_{0.4}:Eu^{2+}$ (1%) synthesized according to a method of the present invention.
Figures 38, 39:
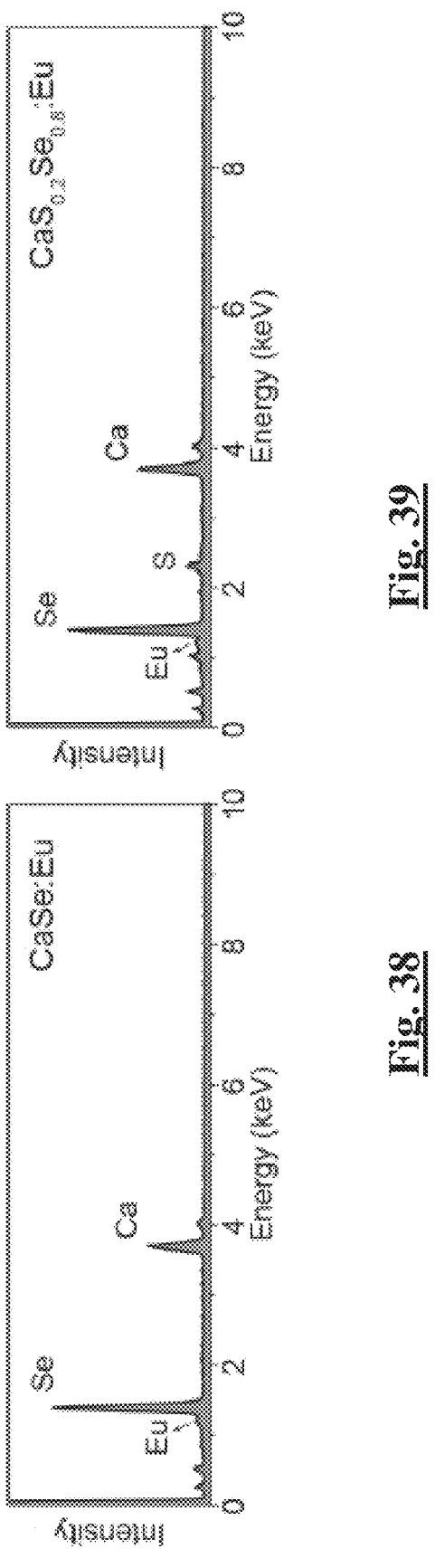
FIG. 38 shows an EDX spectrum of the $CaS_xSe_{(1-x)}:Eu^{2+}$ crystals with a designed composition of CaSe:Eu.
FIG. 39 shows an EDX spectrum of the $CaS_xSe_{(1-x)}:Eu^{2+}$ crystals with a designed composition of $CaS_{0.2}Se_{0.8}:Eu$.
Figures 40, 41:
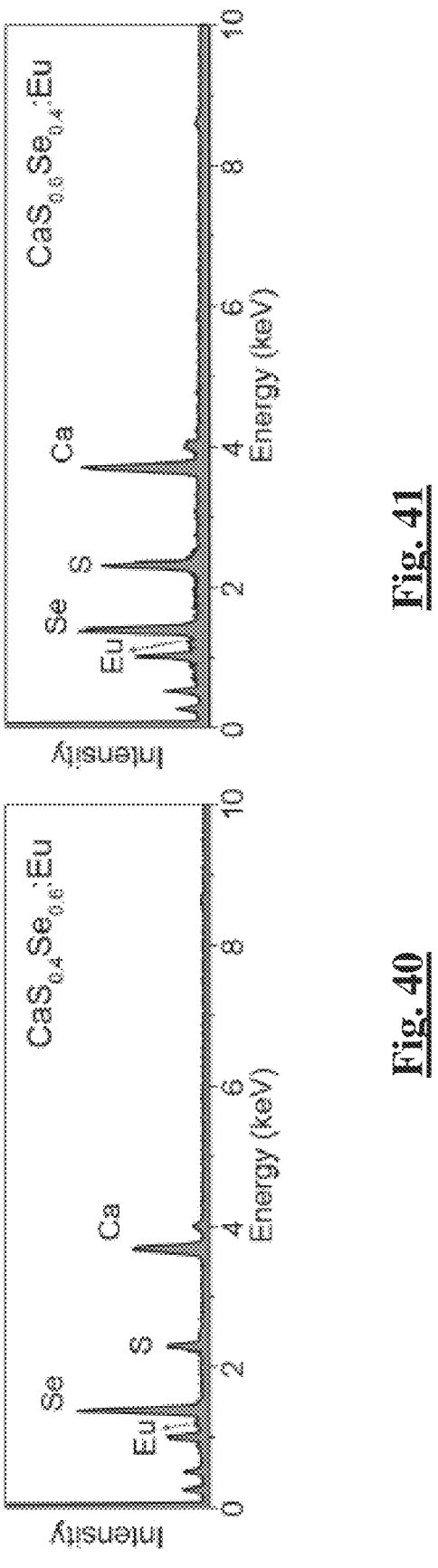
FIG. 40 shows an EDX spectrum of the $CaS_xSe_{(1-x)}:Eu^{2+}$ crystals with a designed composition of $CaS_{0.4}Se_{0.6}:Eu$.
FIG. 41 shows an EDX spectrum of the $CaS_xSe_{(1-x)}:Eu^{2+}$ crystals with a designed composition of $CaS_{0.6}Se_{0.4}:Eu$.
Figures 42, 43:
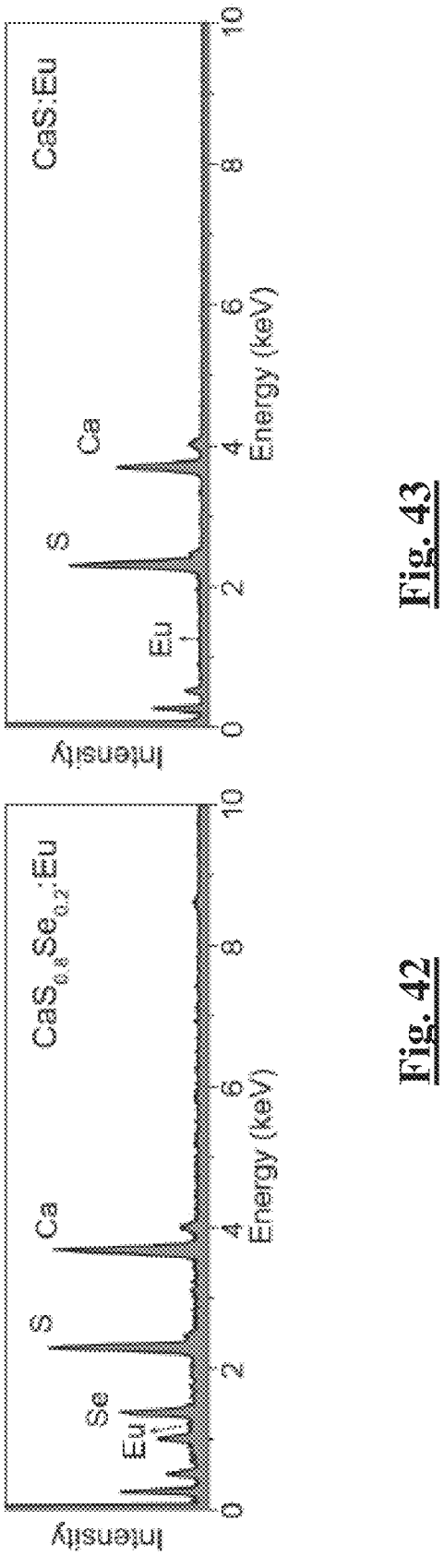
FIG. 42 shows an EDX spectrum of the $CaS_xSe_{(1-x)}:Eu^{2+}$ crystals with a designed composition of $CaS_{0.6}Se_{0.2}:Eu$.
FIG. 43 shows an EDX spectrum of the $CaS_xSe_{(1-x)}:Eu^{2+}$ crystals with a designed composition of CaS:Eu.

The XRD patterns in FIG. 29 reveal the single phase of the crystal with gradually evolving lattice constants. By Rietveld refinement of the XRD patterns of the CaS$_x$Se$_{(1-x)}$ crystals, a linear decrease in the unit-cell volume with the increase of S content was detected (see FIGS. 30 to 36). The results confirmed the successful substitution of S$^{2-}$ ions for larger Se$_2$-(1.84 versus 1.98 Å; coordination number=6) that caused contraction of the crystal lattice according to Vegard's law. EDX mapping of a typical sample composed of CaS$_{0.6}$Se$_{0.4}$:Eu$^{2+}$ further verified the presence of the constituent elements of Ca, S, Se, and Eu uniformly distributed across the crystal (see FIG. 37). Additionally, the calculated atomic ratios were consistent with the designed crystal compositions, as shown in the following Table 1 and FIGS. 38 to 43:

TABLE 1

| Element | 0 | 0.2 | 0.4 | 0.6 | 0.8 | 1 |
|---------|-----|-----|-----|-----|-----|-----|
| Ca | 50.4% | 49.8% | 50.1% | 48.9% | 50.6% | 50.3% |
| Se | 49.0% | 39.2% | 29.3% | 20.5% | 10.0% | / |
| S | / | 10.5% | 20.0% | 29.9% | 38.9% | 49.3% |
| Eu | 0.6% | 0.5% | 0.6% | 0.7% | 0.5% | 0.4% |

Figure 44:
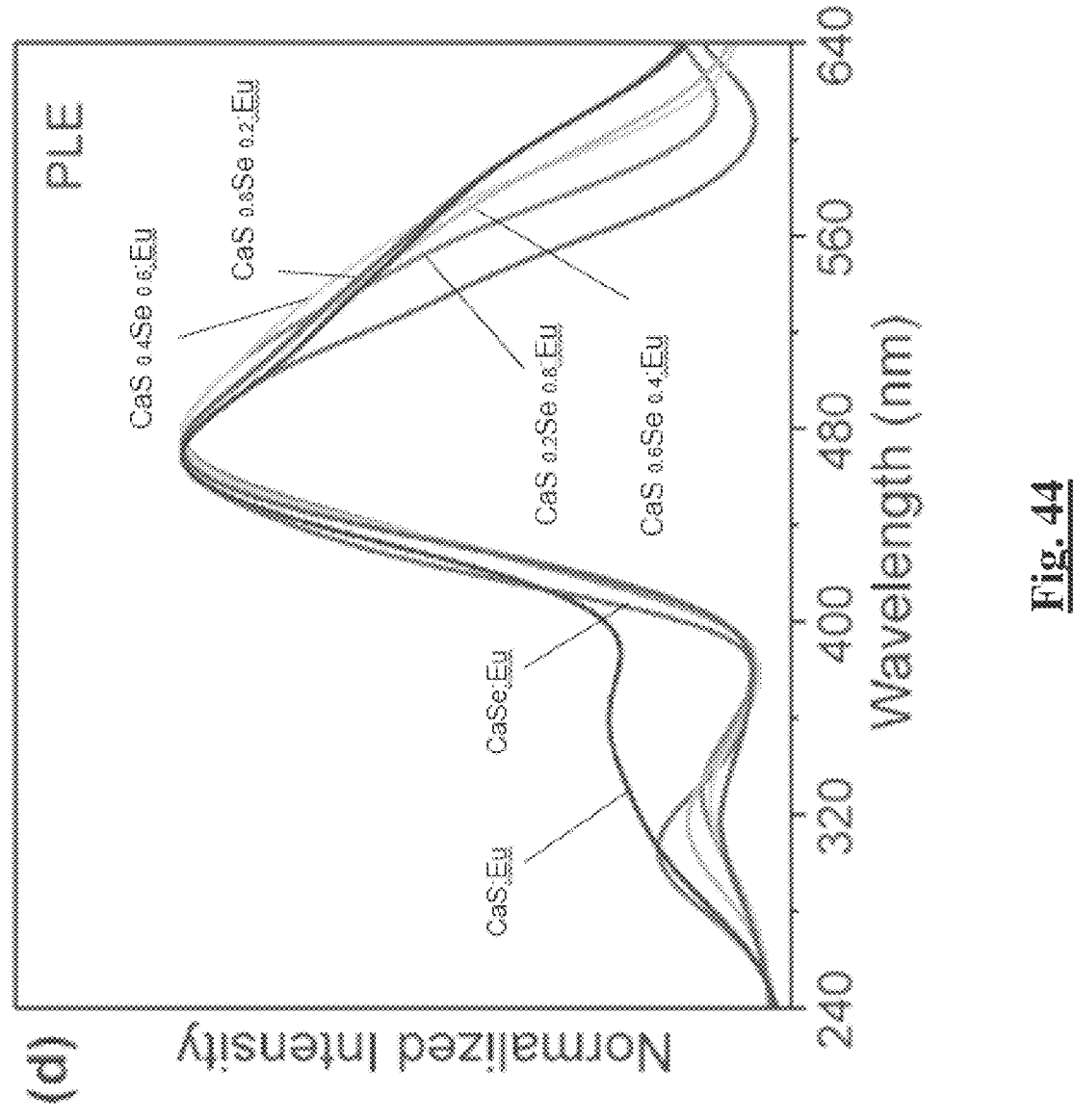
FIG. 44 shows a normalized photoluminescence excitation (PLE) spectra of the as-synthesized $CaS_xSe_{(1-x)}:Eu^{2+}$ formed according to a method of the present invention.
Figure 45:
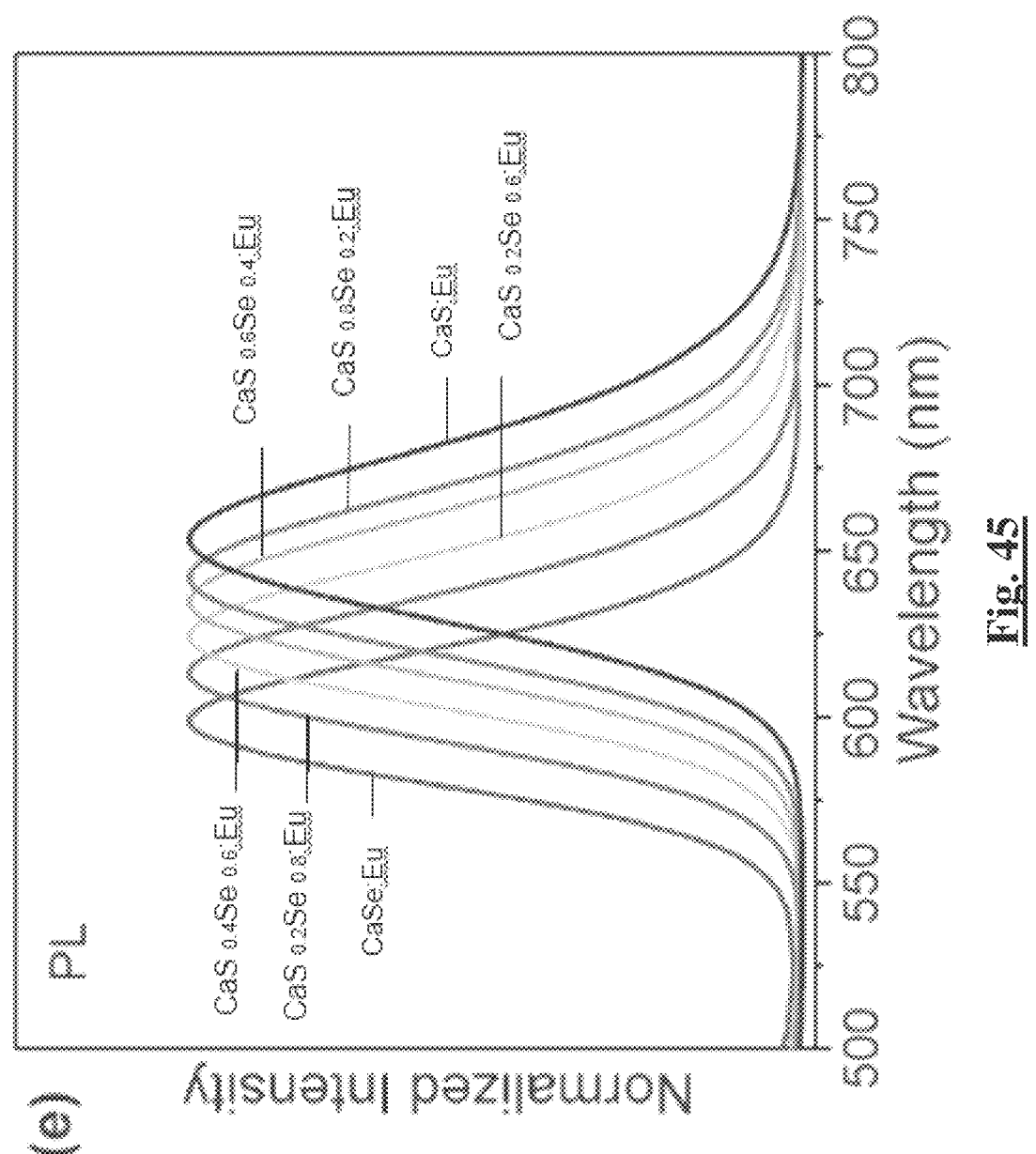
FIG. 45 shows a normalized photoluminescence (PL) spectra of the as-synthesized $CaS_xSe_{(1-x)}:Eu^{2+}$ formed according to a method of the present invention.
Figure 46:
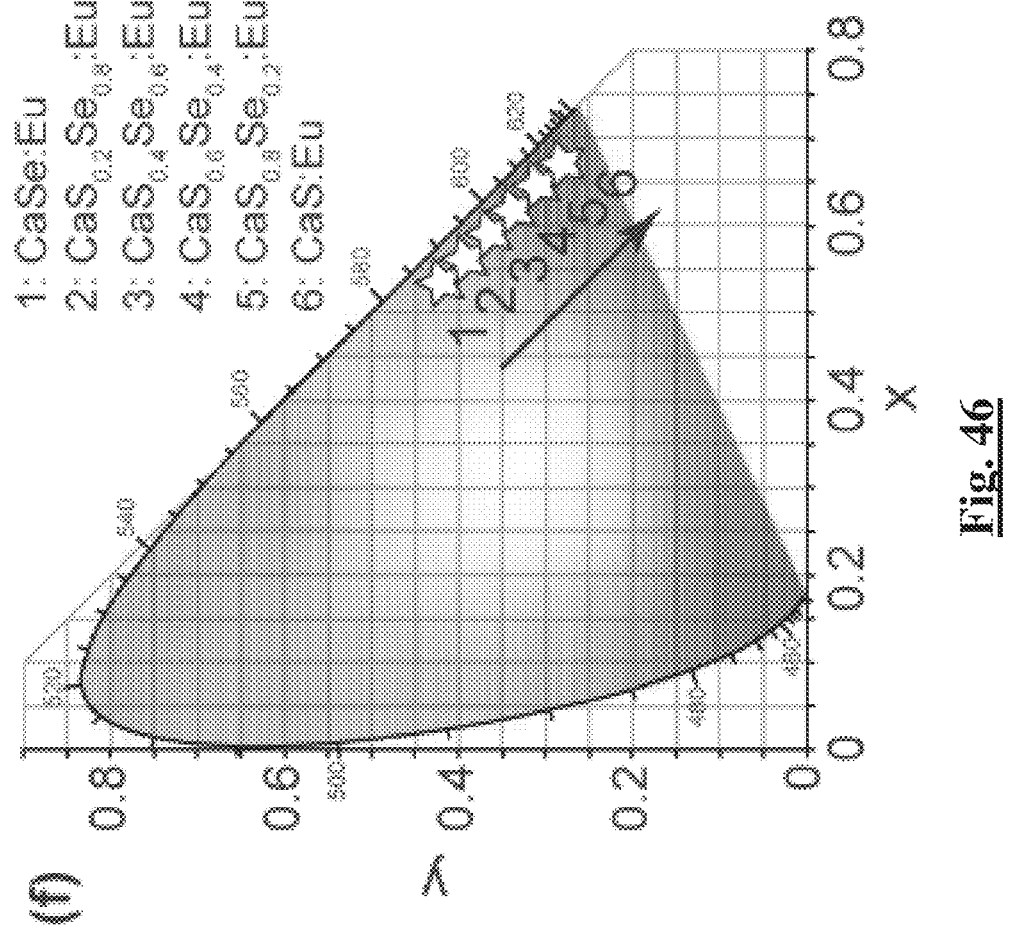
FIG. 46 shows Commission Internationale dC l'Eclairage (CIE) chromaticity coordinates of the multicolor emissions from the samples shown in FIG. 45, in which the chromaticity coordinates of sample nos. 1-6 were (0.529, 0.427), (0.562, 0.391), (0.583, 0.377), (0.610, 0.335), (0.648, 0.315), and (0.667, 0.282), respectively.

The photoluminescence excitation (PLE) and photoluminescence (PL) properties of the $CaS_xSe_{(1-x)}:Eu^{2+}$ crystals were shown in FIGS. 44 and 45. All samples exhibited two excitation peaks at around 320 and 470 nm (see FIG. 44), which were assigned to the host absorption (~320 nm) and $4f^7$ ($8S^{7/2}$)→$4f^65d^1$ transition of the $Eu^{2+}$ (470 nm), respectively. The emission spectrum under excitation of 470 nm exhibits the characteristic $Eu^{2+}$ band centered at ~600 nm owing to the $4f^65d^1$→$4f^7$ transition (see FIG. 45). As the $S^{2-}$ concentration in the crystals increased from 0 to 100%, the emission peak was red-shifted from 598 nm to 654 nm, corresponding to a color change from orange to deep red as shown in the CIE chromaticity coordinate diagram of FIG. 46. The spectral shift was ascribed to S-induced increase of the crystal-field strength, which enhanced splitting of the $Eu^{2+}$ 5d level. By changing the coordination environment of $Eu^{2+}$, S alloying also resulted in an increase of the quantum yields from 12.4 to 46.2%, as per Table 2 below:

TABLE 2

| $CaS_xSe_{(1-x)}:Eu^{2+}$ | x = 0 | x = 0.2 | x = 0.4 | x = 0.6 | x = 0.8 | x = 1 |
|---|---|---|---|---|---|---|
| Quantum Yield (QY) | 12.4% | 14.6% | 18.0% | 26.8% | 33.5% | 46.2% |

XRD patterns were recorded on a Bruker AXS D2 phaser with graphite monochromatized Cu Kα radiation (λ=1.5406 Å). SEM images were recorded on a Hitachi SU 8020 scanning electron microscope. EDX element maps were obtained by a HOBIRA EMAX X-ray detector. PL and ACEL spectra were obtained by a Hitachi F-4600 spectrophotometer equipped with an R928 photomultiplier tube (PMT) detector. Quantum yields (QYs) were determined on an Edinburgh FLS980 spectrometer equipped with a barium sulfate-coated integration sphere. The QY was calculated using the following equations: $QY=\int L_S/(\int E_R-\int E_S)$, in which $L_S$ represents the emission spectrum of the sample and $E_R/E_S$ is the spectrum of the excitation light from the integrated sphere without/with the sample. To evaluate the EL performance, the devices were connected to a high-voltage AC power supply (California Instruments 4500Ls), and the output voltage range was set to 0-500 V at frequencies up to 40 kHz. The luminance of the devices was measured using an ILT 350 (International Illumination Technology) illuminance spectrophotometer. The built-in recording function of the programmable AC power supply was used to record the actual voltage and current. The power input was obtained by multiplying the actual voltage and current. The luminous efficiencies of the ACEL devices were obtained by dividing the luminance by the power input. All optical measurements were carried out at room temperature and under identical conditions. All the luminescence images were captured by a Canon digital camera.

Figure 47:
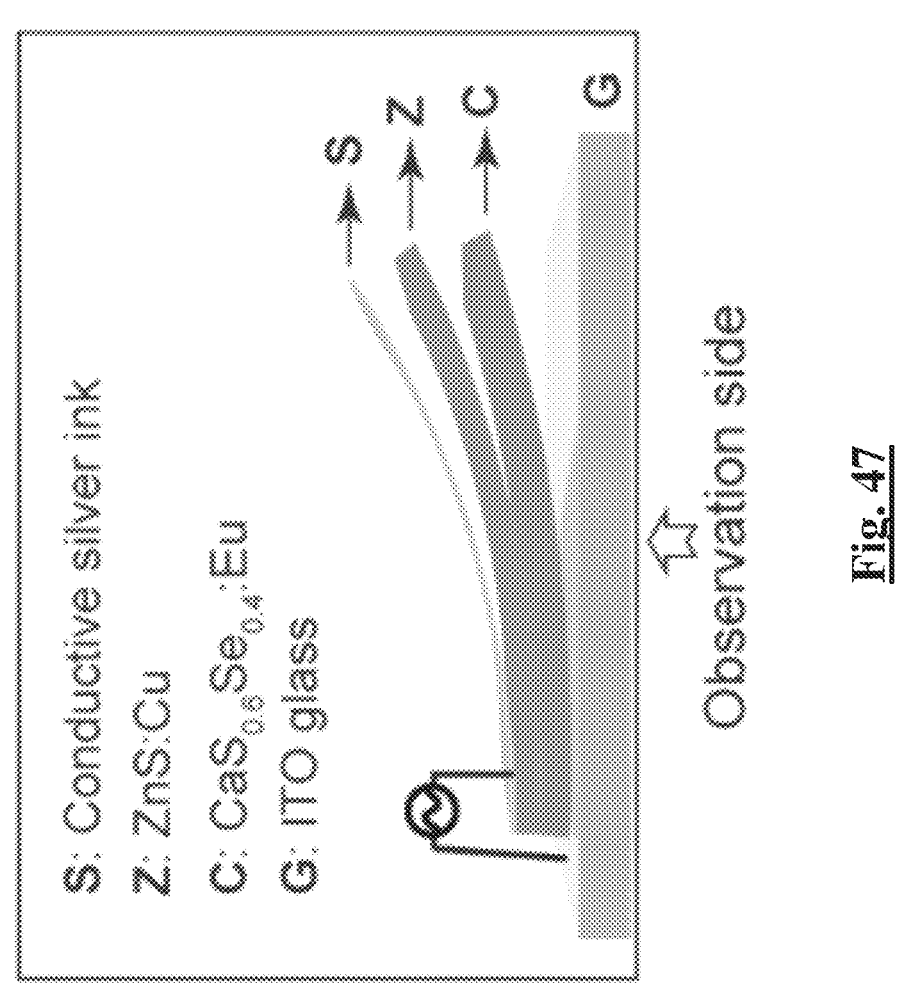
FIG. 47 is a schematic diagram of an alternating current electroluminescence (ACEL) device with a layer of an alkaline-earth metal selenium-sulfide alloy doped with luminescent ions formed by a method according to the present invention.
Figure 48:
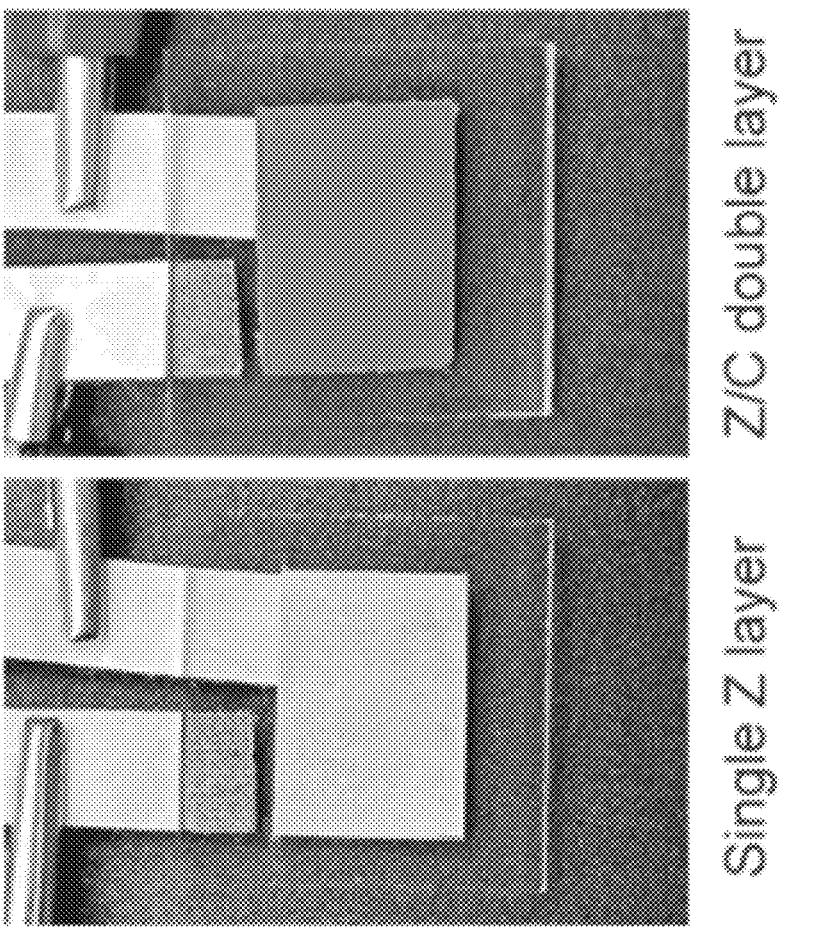
FIG. 48 are photographs of the as-fabricated ACEL devices with a single ZnS:Cu (Z) layer and ZnS:Cu/$CaS_{0.6}Se_{0.4}:Eu$ (Z/C) double layers, respectively.
Figure 49:
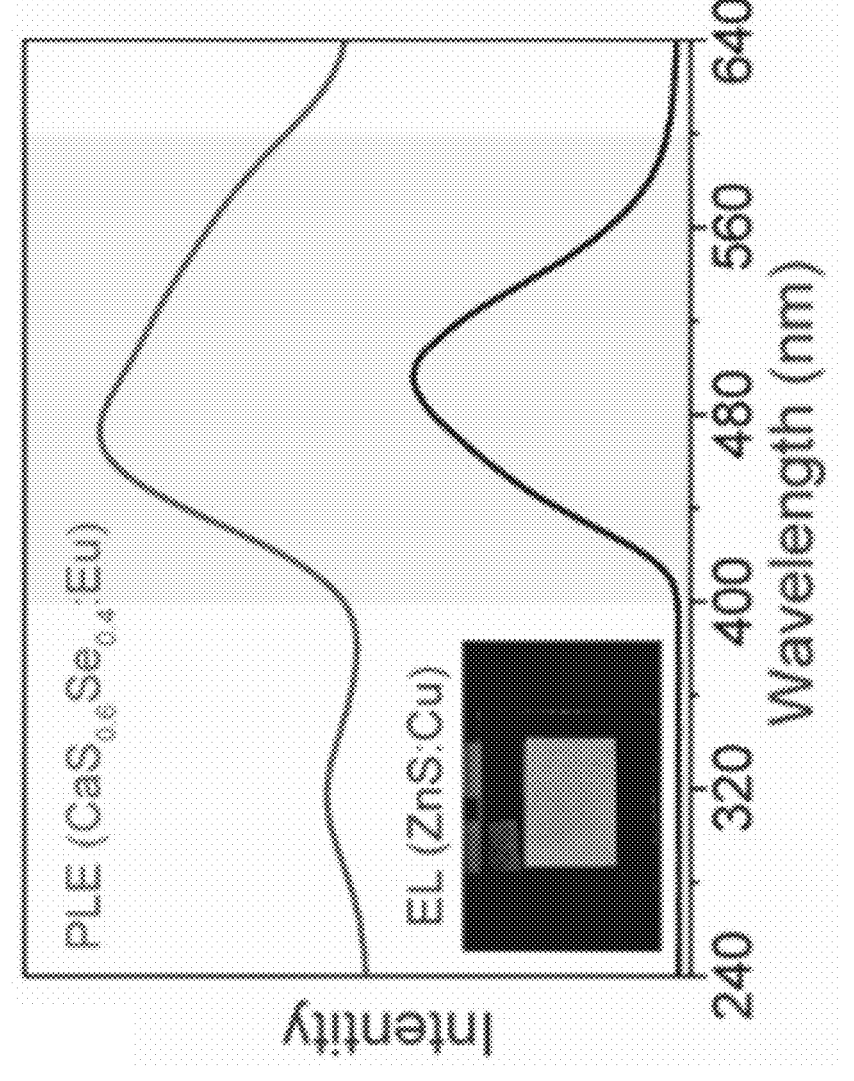
FIG. 49 is a graph of comparison of the photoluminescence excitation (PLE) spectra of $CaS_{0.6}Se_{0.4}:Eu^{2+}$ (monitored at 635 nm) and the electroluminescence (EL) emission spectra of ZnS:Cu, in which the inset shows the EL image of the ACEL device comprising a single ZnS:Cu (Z) layer tested at 300 V/10 kHz.

The alloyed Ca(S,Se):$Eu^{2+}$ crystals with broad and tunable emissions appeal to lighting applications, especially for composing white light in combination with devices emitting in the short wavelength. A white alternating current electroluminescence (ACEL) device was devised by combining commercially available ZnS:Cu with $CaS_{0.6}Se_{0.4}:Eu^{2+}$ on account of their complementary emission colors. FIG. 47 depicts the schematic design of the ACEL device, which featured a stacked configuration comprising a silver ink conductive top(S), a ZnS:Cu EL layer (Z), a $CaS_{0.6}Se_{0.4}$:$Eu^{2+}$ phosphor layer (C), and an indium-tin-oxide (ITO) glass substrate (G). FIG. 48 shows photographs of typical ACEL devices comprising a single Z layer and Z/C double layers observed through the G layer. The EL emission peak of ZnS:Cu at ~500 nm was reasonably resonant with the $4f^7$ to $4f^65d^1$ transition of $Eu^{2+}$ in $CaS_{0.6}Se_{0.4}:Eu^{2+}$ (see FIG. 49), which ensures efficient energy transfer for the construction of phosphor-converted ACEL.

The phosphors and epoxy resin at a mass ratio of 1:1 were uniformly mixed by stirring for 10 minutes. The mixture was kept under vacuum for 30 minutes to remove air bubbles, then scraped uniformly onto the ITO glass and heated at 100° C. for 30 minutes. Using the same method, 0.1 g of ZnS:Cu commercial powder was covered on the surface of the phosphor layer. After the epoxy resin was cured, the silver paste was uniformly covered onto the uppermost layer of the prepared device to enhance its conductivity. Finally, copper tapes were applied to the devices for testing.

Figure 50:
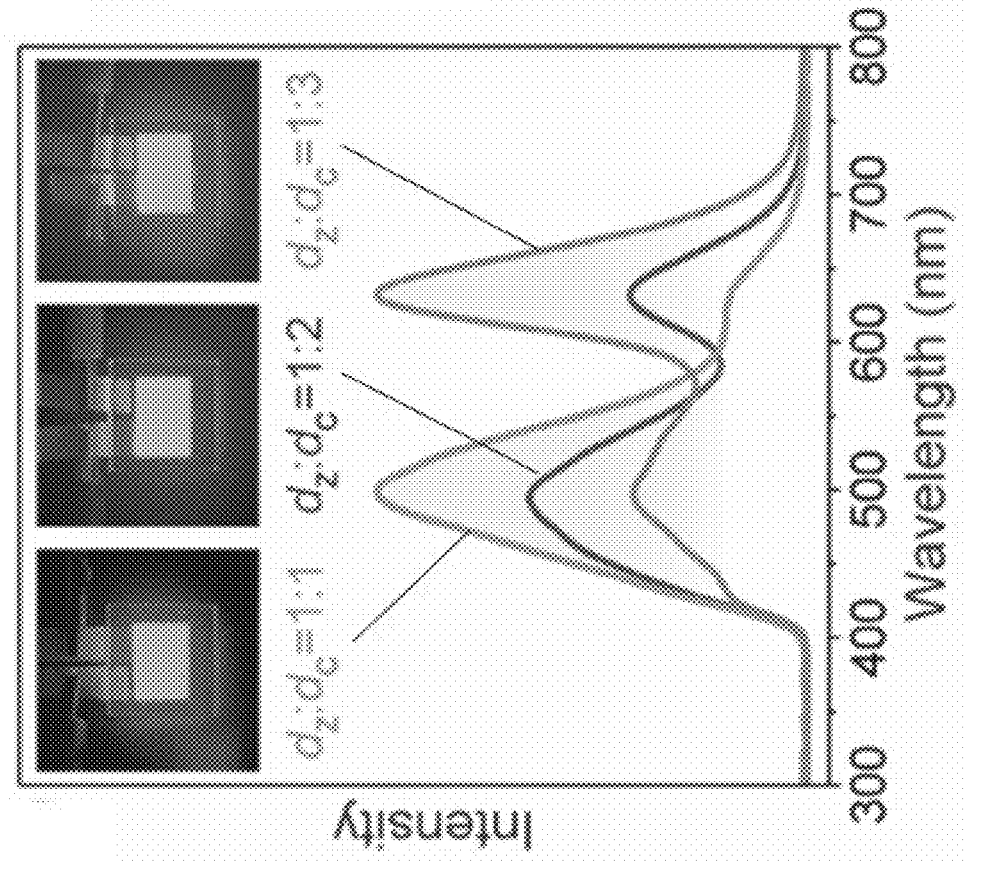
FIG. 50 shows emission spectra of ZnS:Cu/$CaS_{0.6}Se_{0.4}:$Eu (Z/C) double layers ACEL devices with $d_Z:d_C$ of 1:1, 1:2, and 1:3, respectively, in which the insets are corresponding images of the ACEL device showing cool, normal, and warm white light emissions, respectively.
Figure 51:
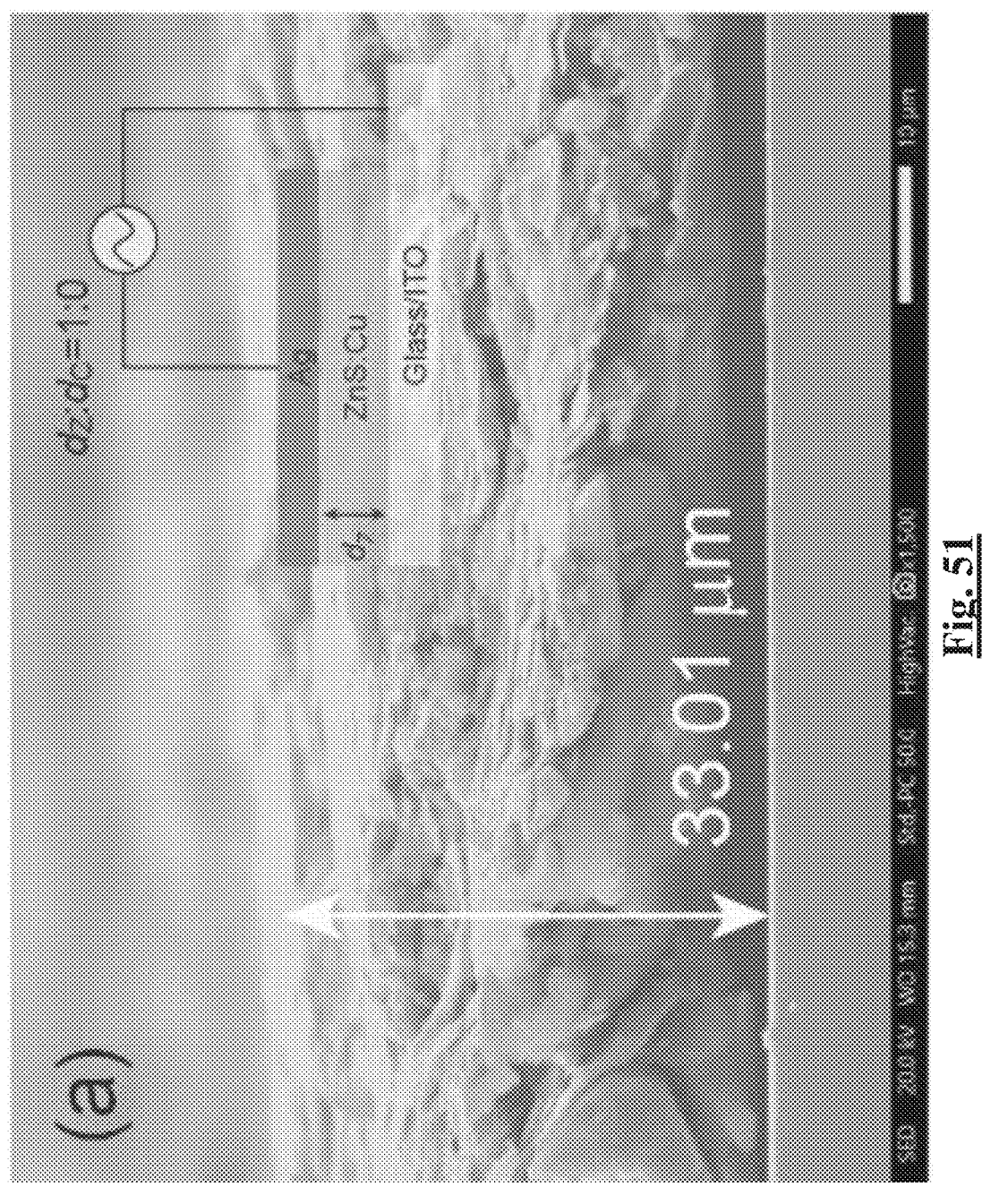
FIGS. 51, 52, 53, and 54 show images of the cross-sections of the as-fabricated ACEL devices with $d_Z:d_C$ ratios of 1:0, 1:1, 1:2, and 1:3, respectively.
Figure 52:
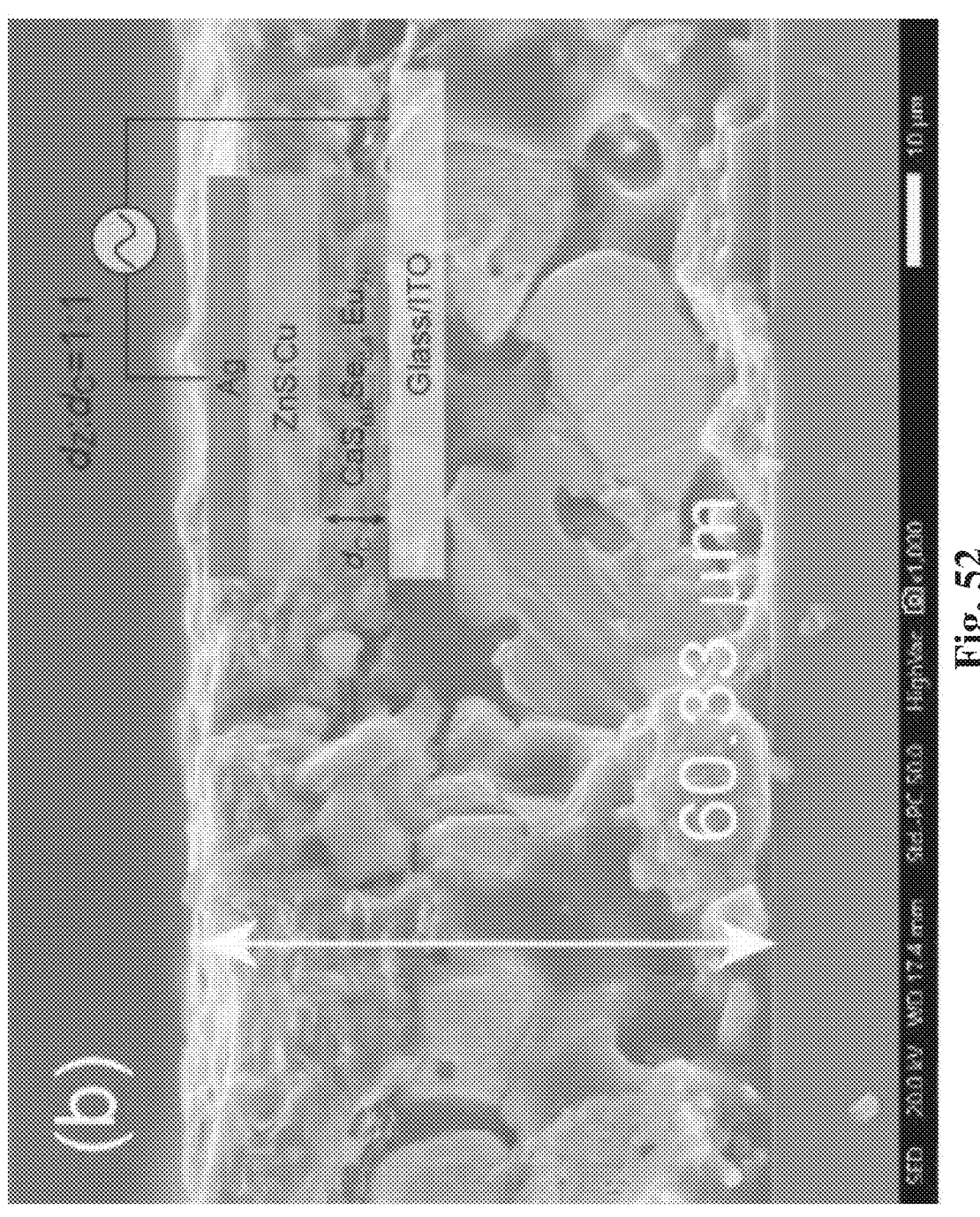
Figure 53:
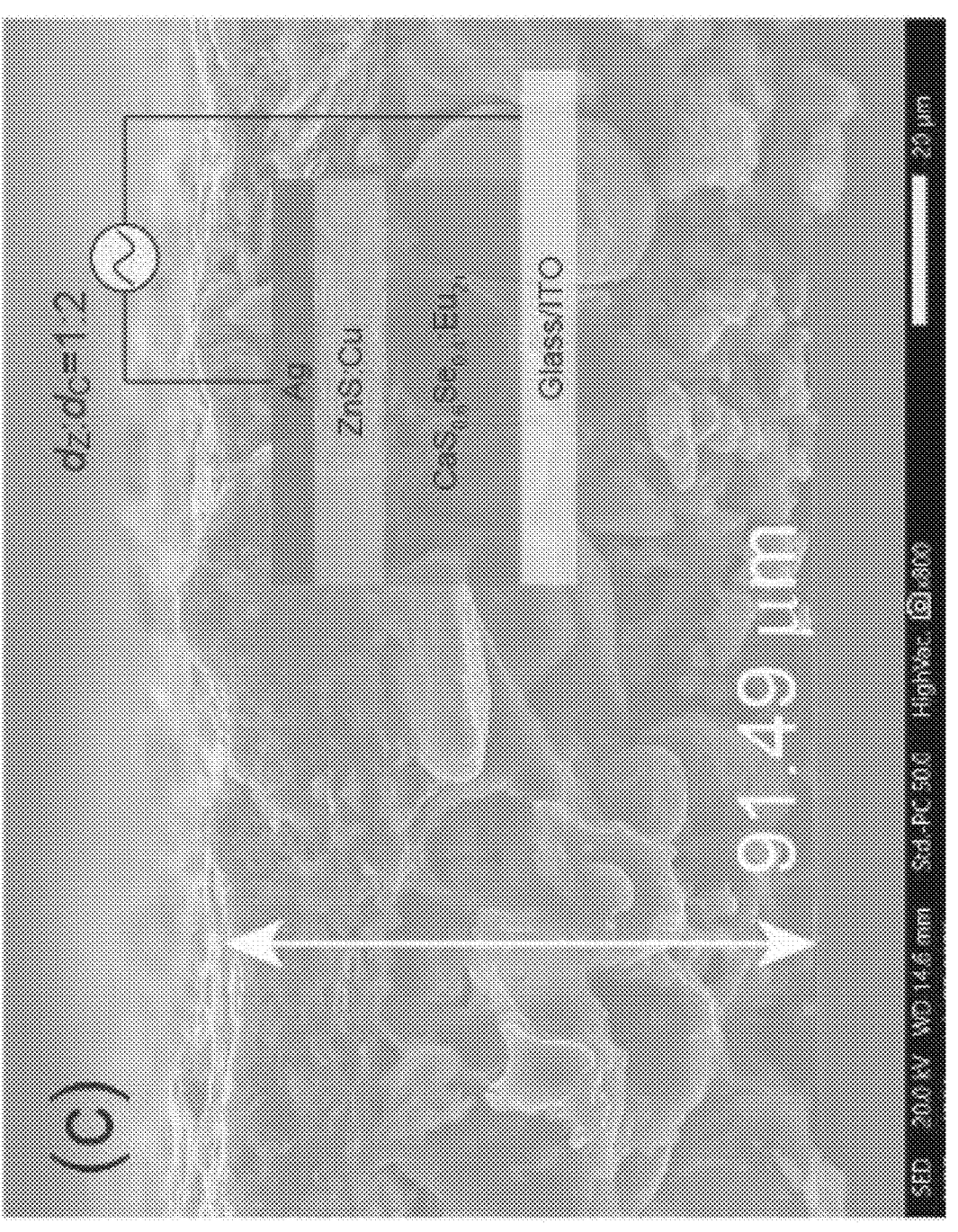
Figure 54:
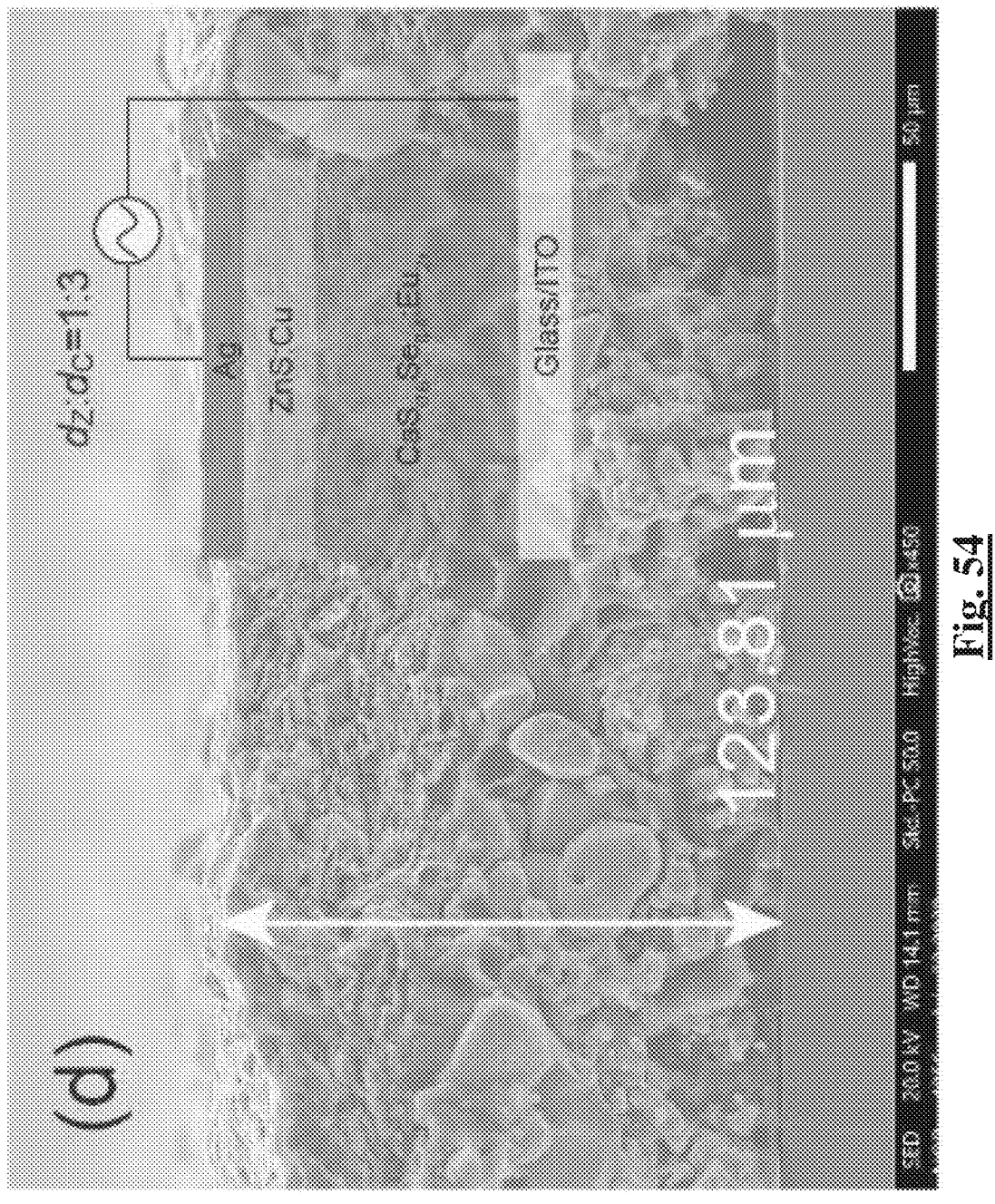
Figure 55:
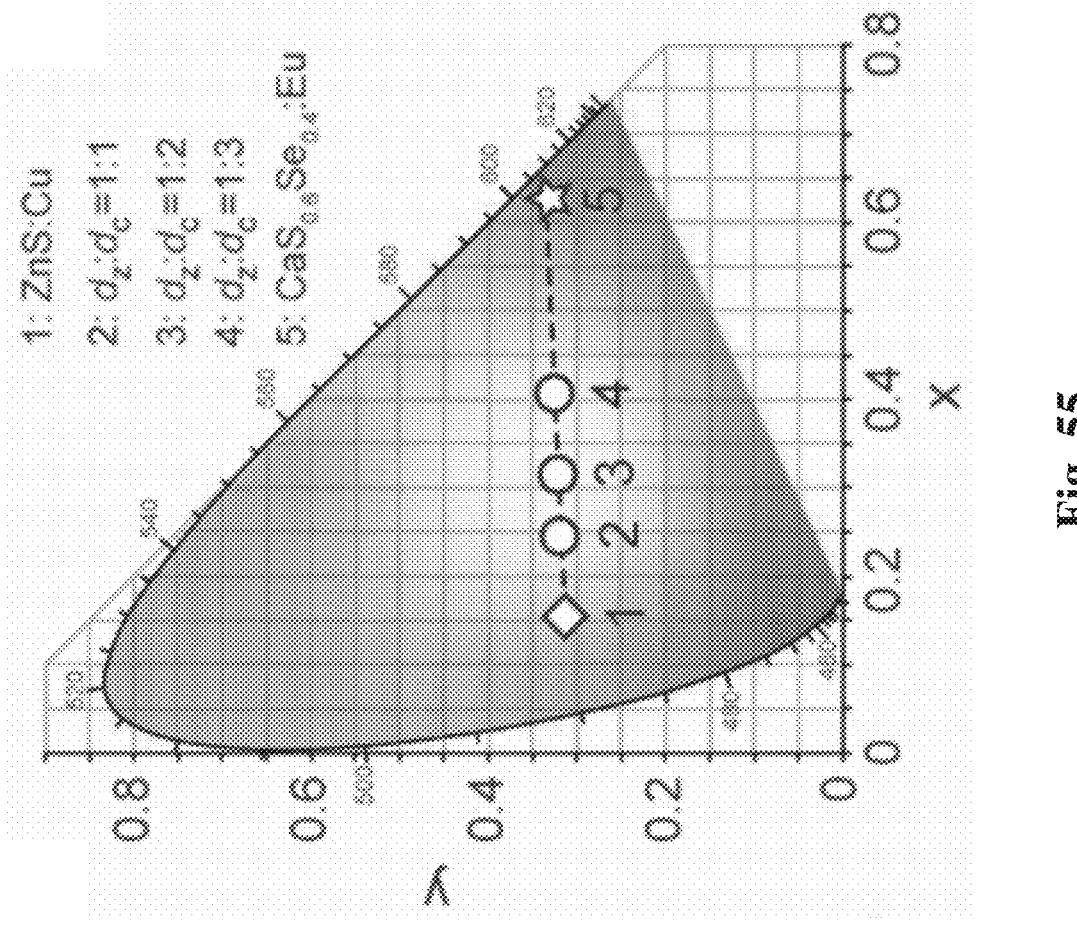
FIG. 55 show CIE chromaticity coordinates of the white light emissions from the ACEL devices shown in FIGS. 49 and 50, in which the color coordinates of the sample nos. 1-4 were: (0.159, 0.320), (0.240, 0.324), (0.321, 0.328), and (0.410, 0.332), respectively. For reference, the color coordinate of photoluminescence from $CaS_{0.6}Se_{0.4}:Eu^{2+}$ (referred to as sample no. 5) (0.610, 0.335) is also shown.
Figures 56, 57:
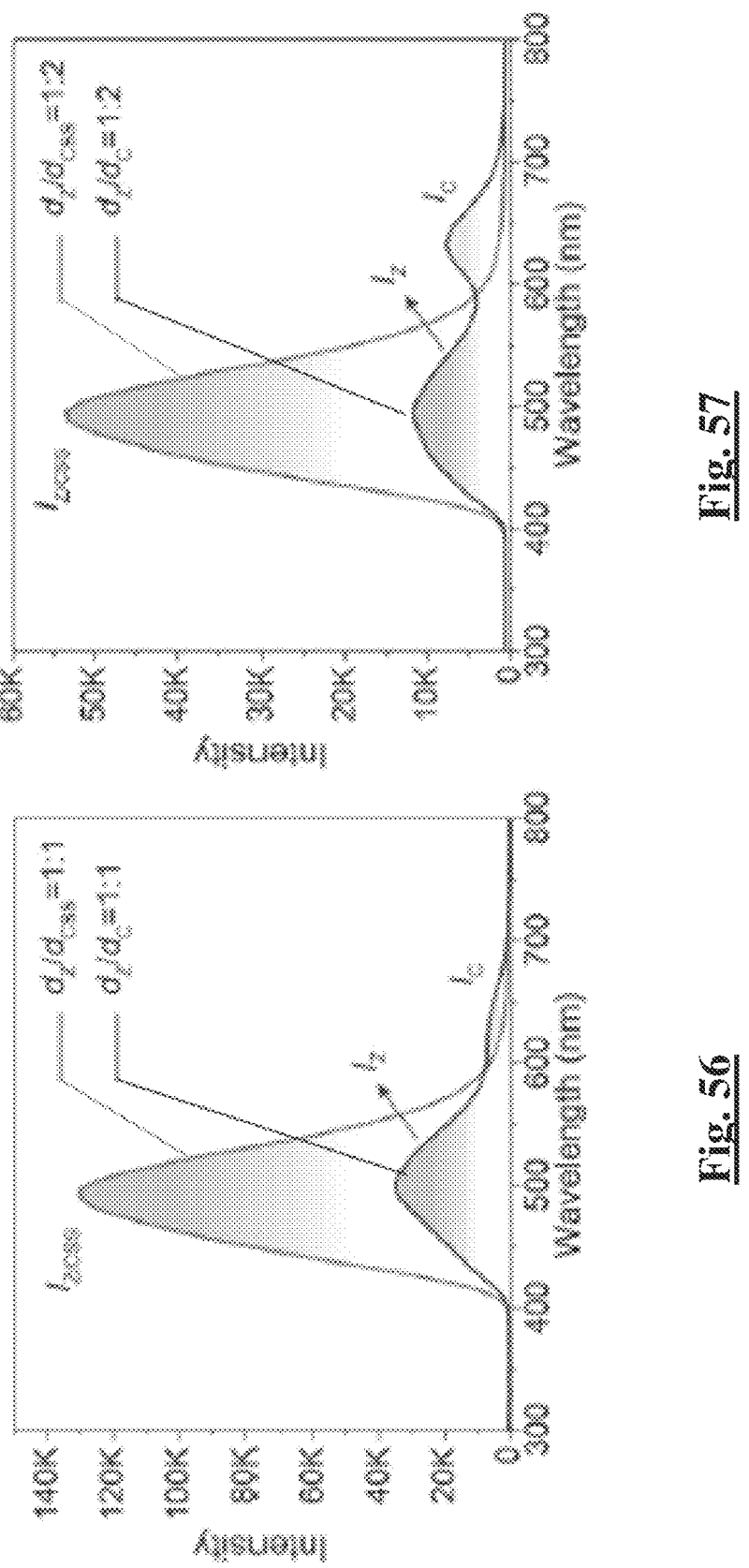
FIGS. 56, 57, and 58 show color-conversion efficiency of the as-fabricated ACEL devices with a $d_Z:d_C$ of (a) 1:1, (b) 1:2, and (c) 1:3, respectively. Note that the reference devices were fabricated by combining ZnS:Cu with inert $CaS_{0.6}Se_{0.4}$ (CSS layer)
Figure 58:
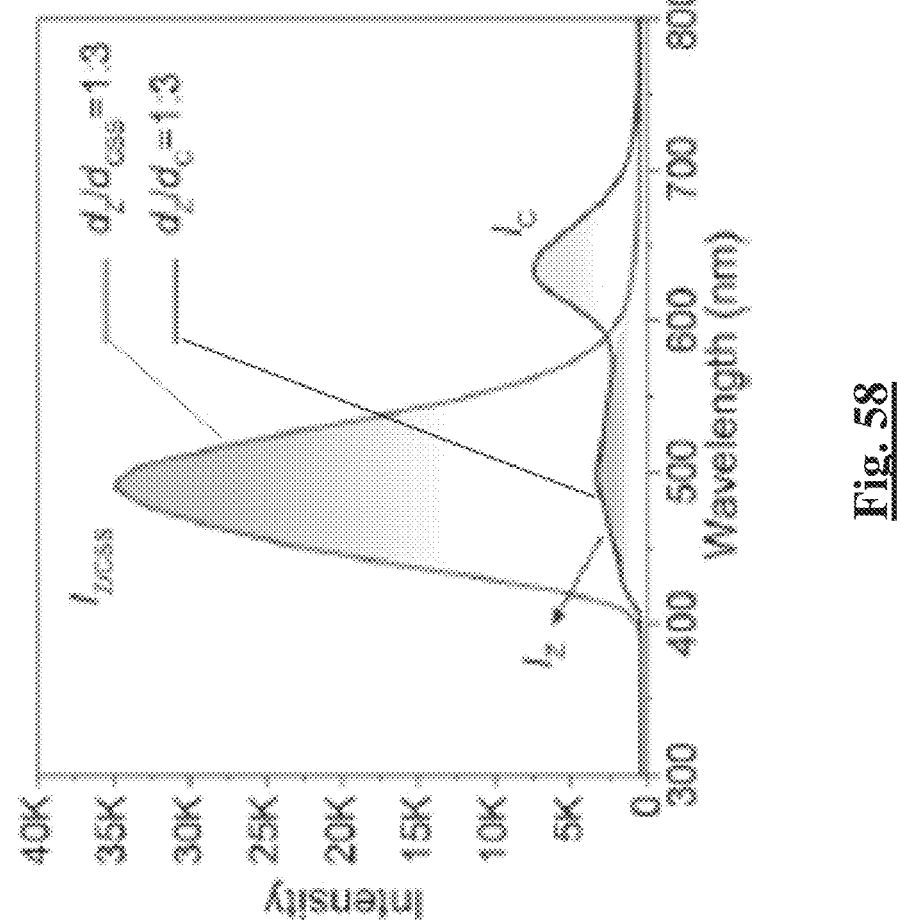

FIG. 50 shows the emission spectra of the ACEL devices comprising Z/C double layers tested at 300 V/10 kHz. By fixing the thickness of the Z layer ($d_Z$, ~30 μm) and gradually increasing the thickness of the C layer ($d_C$, ~30-90 μm) (as shown in FIGS. 51 to 54), precise control over the emission intensity balance of the two layers could be realized, demonstrating emission fine-tuning from greenish-blue to white and then to warm white (see FIG. 55). The corresponding color-conversion efficiencies ($\eta_{CCE}$) were estimated using the following equation:

$$\eta_{CCE} = I_C/(I_{Z/CSS} - I_Z) \qquad \text{(Equation 4)}$$

wherein $I_C$ and $I_Z$ are the respective emission intensities of C and Z components in the Z/C double-layer devices, and $I_{Z/CSS}$ is the emission intensity of the reference devices composed of ZnS:Cu and inert $CaS_{0.6}Se_{0.4}$, as shown in FIGS. 56 to 58 The calculated $\eta_{CCE}$ were about 9.2, 16.7, and 22.6% at a $d_Z:d_C$ of 1:1, 1:2, and 1:3, respectively, wherein $d_Z$ is the thickness of the Z layer, and $d_C$ is the thickness of the C layer.

A drop in device brightness with the increase of $d_C$ was observed, owing to the decreased electric field. Specifically, luminance of 17.65, 10.44, and 2.81 cd m$^{-2}$ were recorded for devices with a $d_C$ of about 30, 60, and 90 μm, respectively. The brightness is comparable to the screen of a smart sports bracelet (21.46 cd m$^{-2}$ at 50% brightness). The luminous efficiency for devices with a $d_C$ of about 30, 60, and 90 μm was further determined to be 10.51, 6.24, and 1.67 cd (W·m$^2$)$^{-1}$, respectively. The reduction of luminous efficiency in thick devices was ascribed to increased loss of light transmittance.

Figure 59:
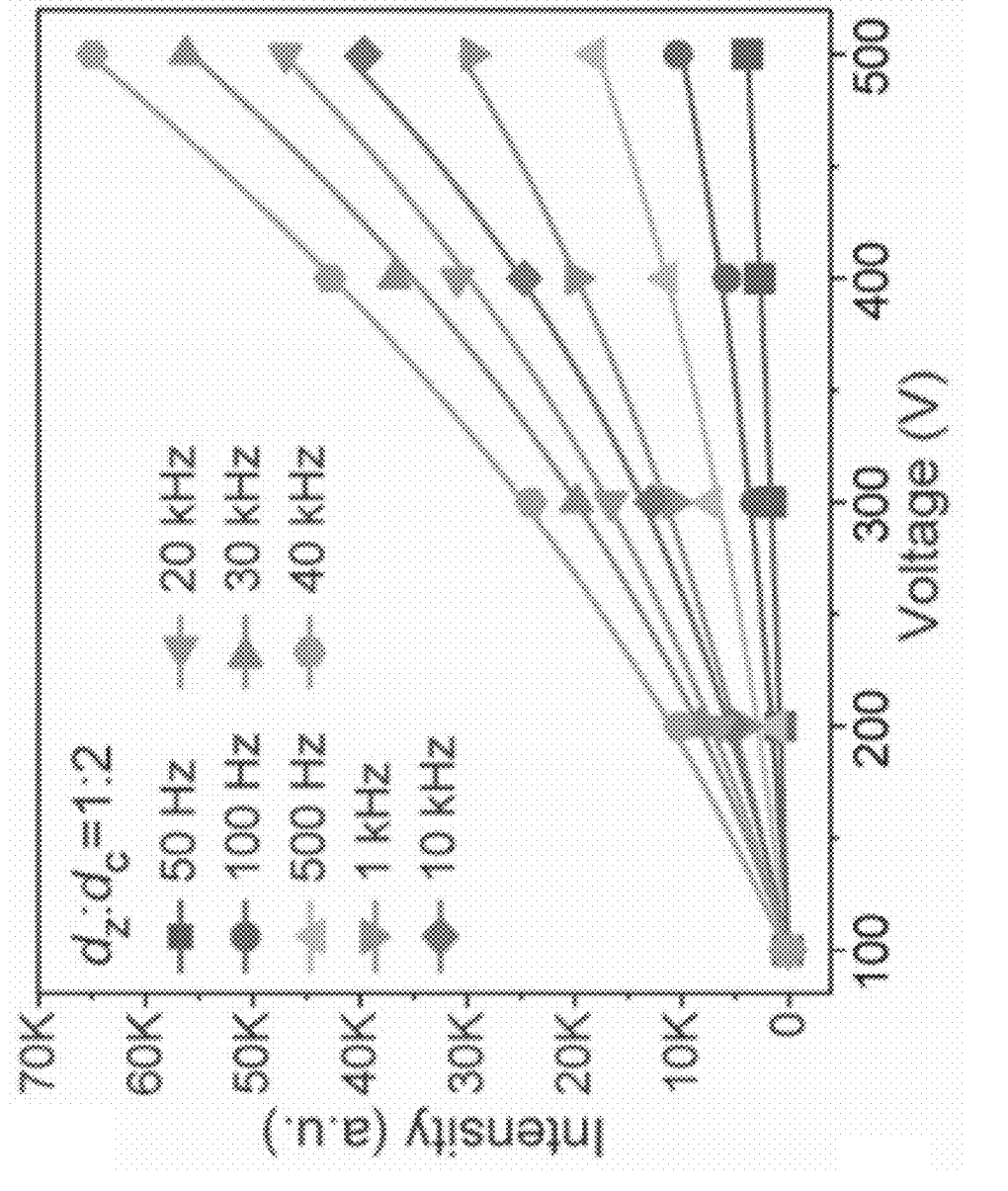
FIG. 59 shows integrated luminescence intensity of the ACEL device with $d_Z:d_C$ of 1:2 at different application voltages and frequencies.
Figures 60, 61:
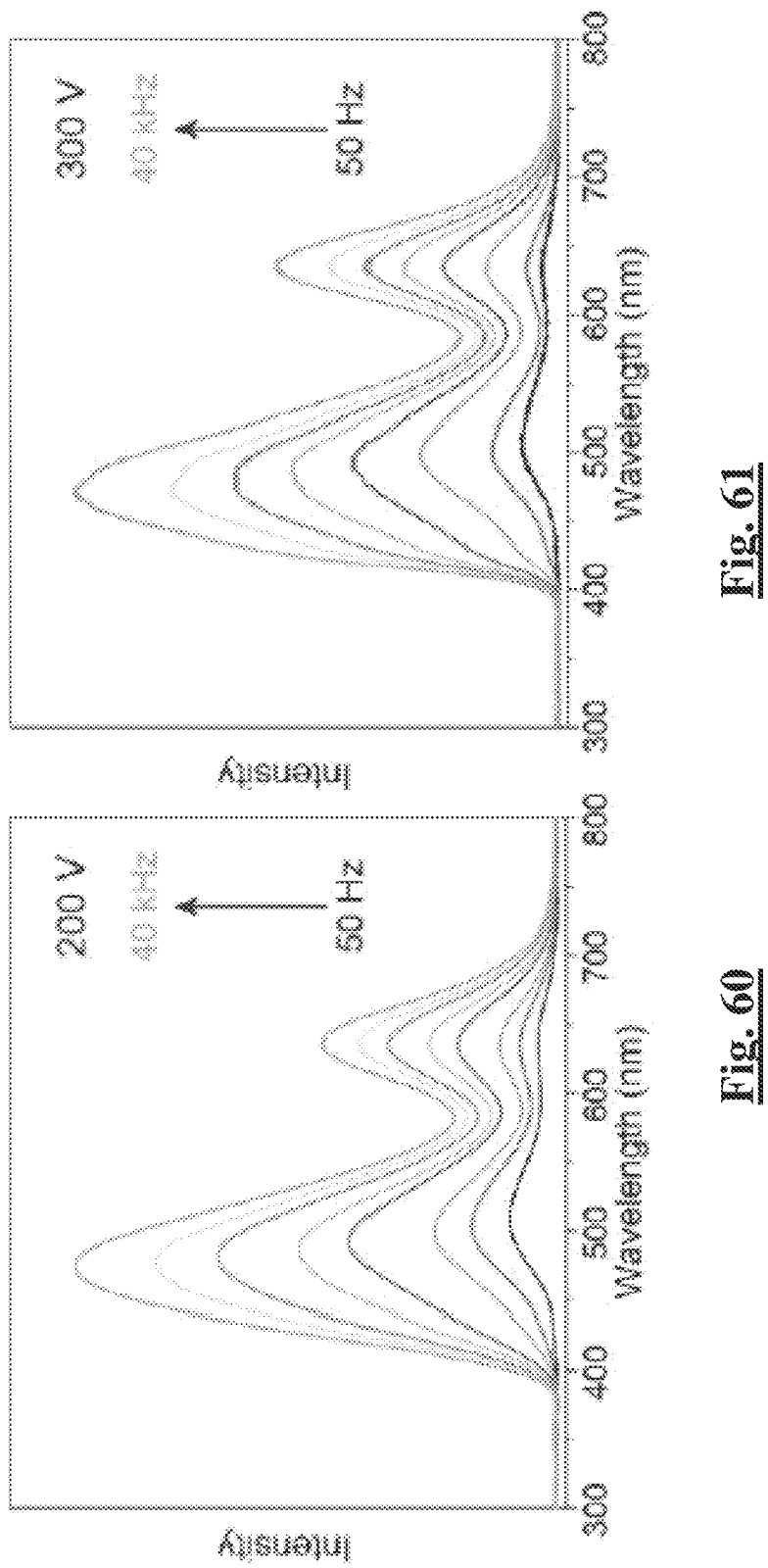
FIGS. 60, 61, 62, and 63 show luminescence spectra of the ACEL device comprising Z/C double layers with a $d_Z:d_C$ of 1:2 at a driving voltage of (a) 200 V, (b) 300 V, (c) 400 V, and (d) 500 V in the frequency range from 50 Hz to 40 kHz, respectively.
Figures 62, 63:
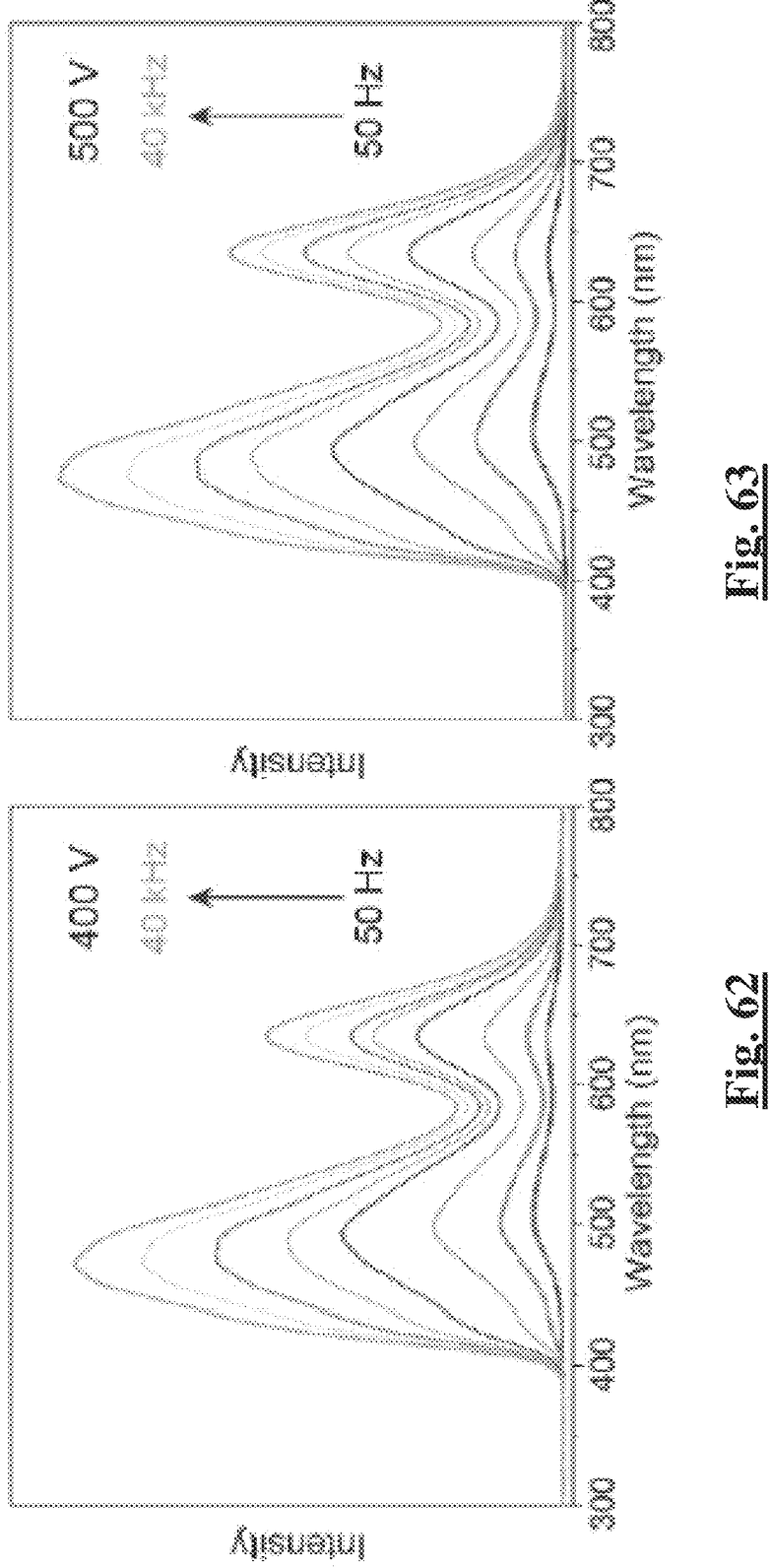
Figures 64, 65:
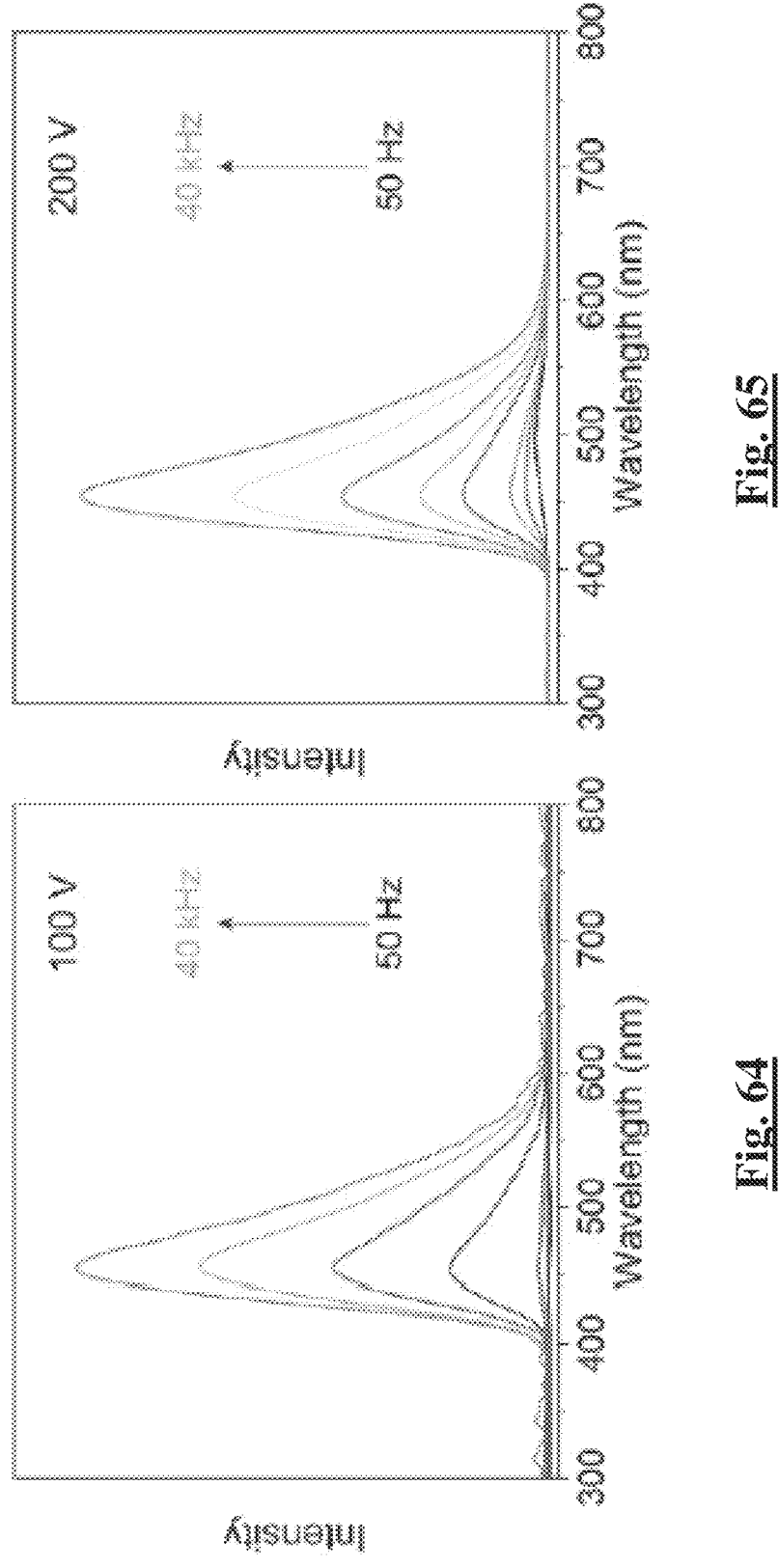
FIGS. 64, 65, 66, 67, and 68 show luminescence spectra of the ACEL device comprising a single Z layer at a driving voltage of (a) 100 V, (b) 200 V, (c) 300 V, (d) 400 V, and (e) 500 V in the frequency range from 50 to 40 kHz, respectively.
Figures 66, 67:
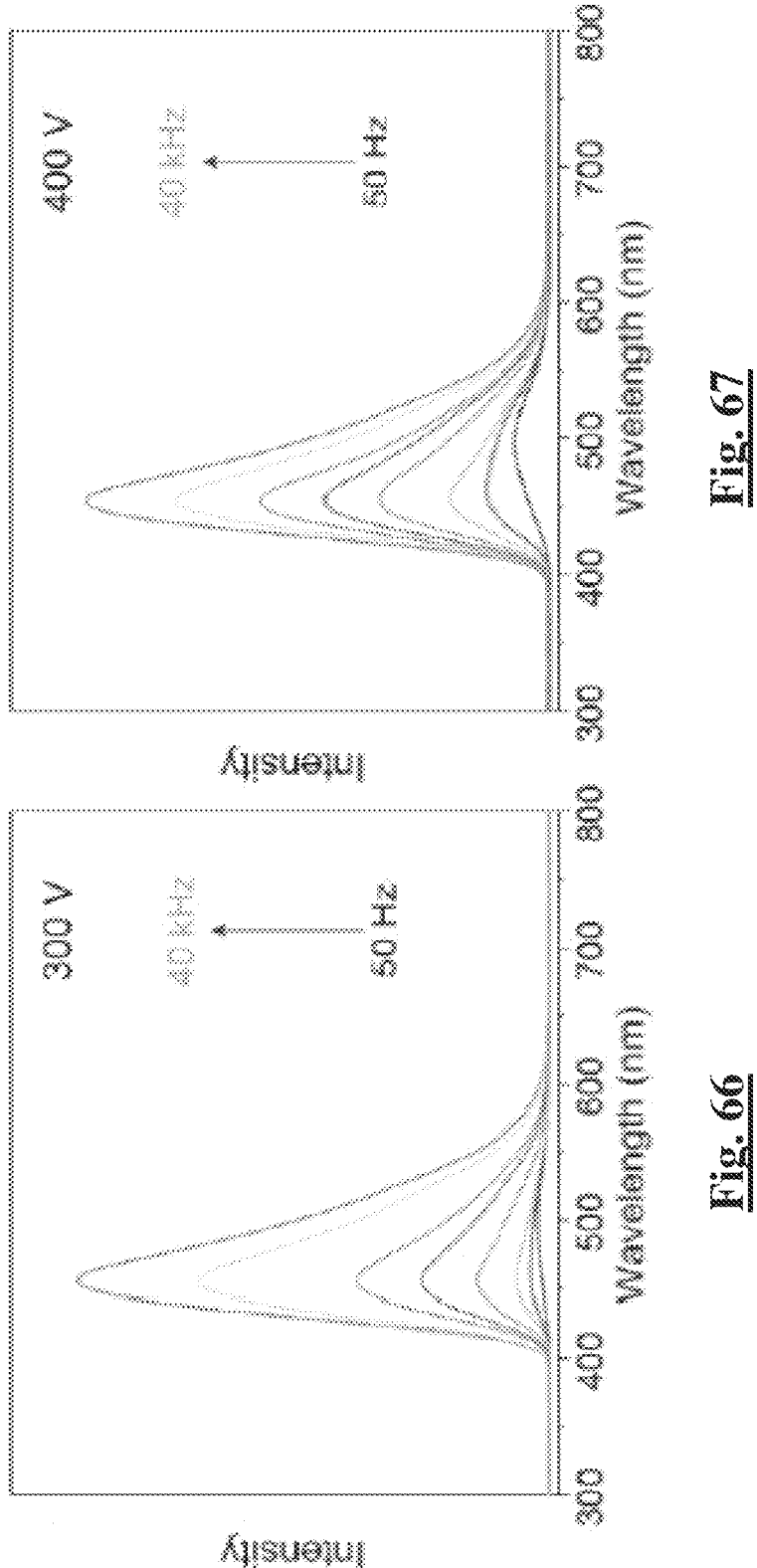
Figures 68, 69:
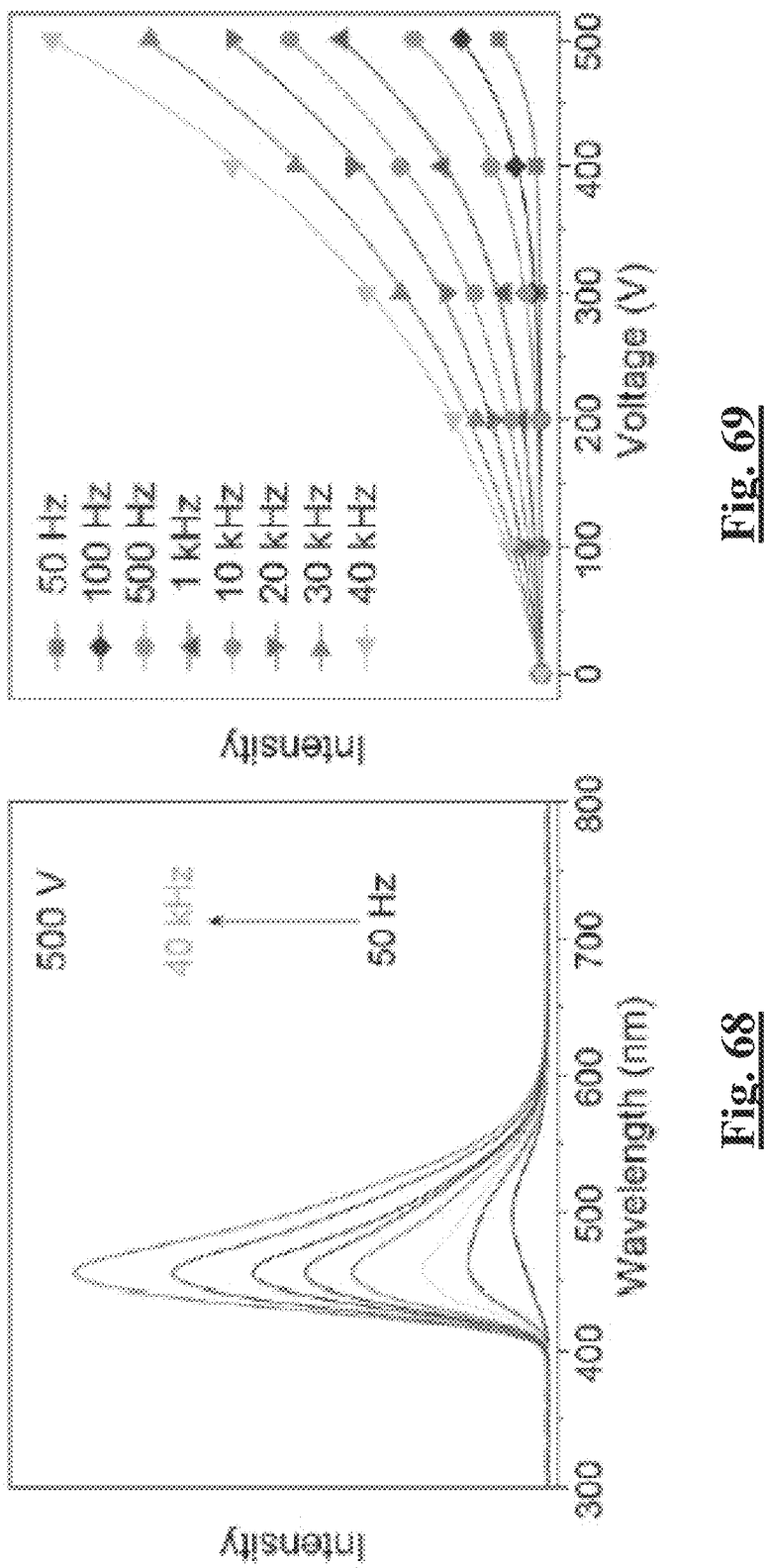
FIG. 69 shows the integrated luminescence intensity comparison curves.
Figure 70:
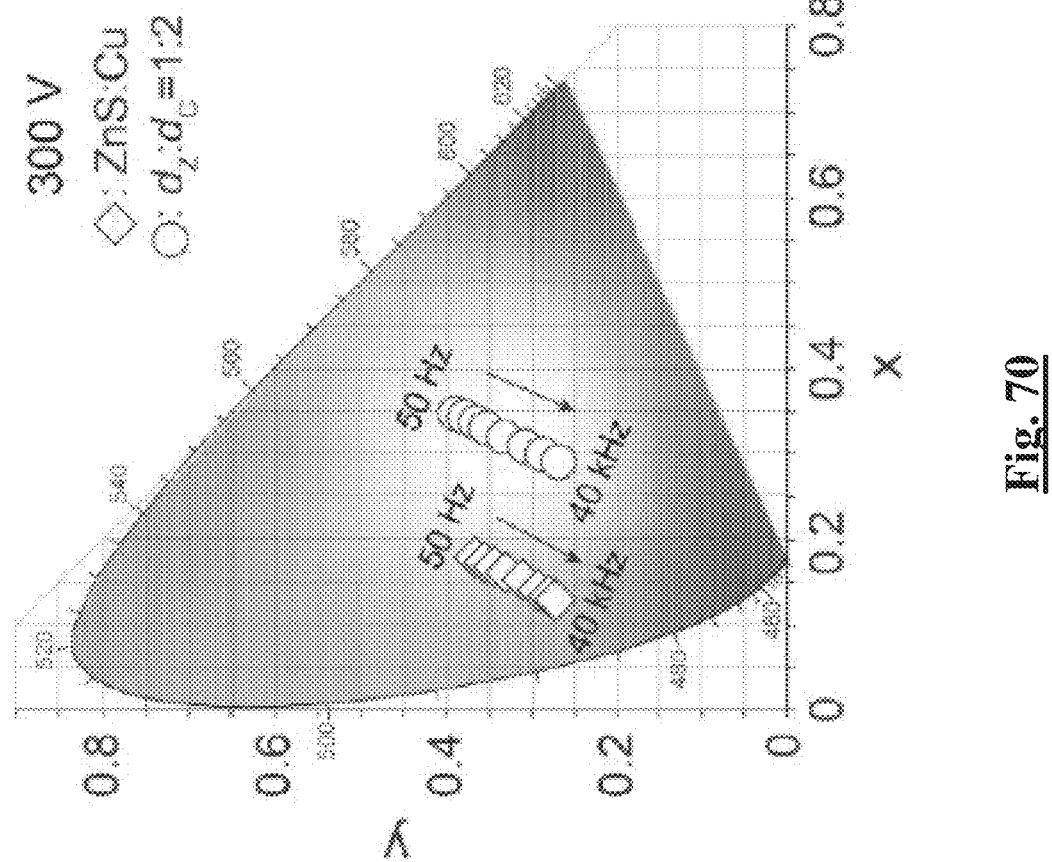
FIG. 70 shows CIE chromaticity coordinates of the light emission from the single Z layer device and the Z/C double-layer device ($d_C$=60 μm) as a function of frequency at 300 V.

The ACEL device was characterized with a $d_C$ of 60 μm that exhibited white emissions. FIG. 59 shows the emission intensity of the ACEL device as a function of applied voltages in the 100-500 V range at different frequencies, as further shown in FIGS. 60 to 63. As shown in FIG. 59, the device can be well lit up by excitation of ~200 V at a frequency of 50 Hz. Moreover, the luminescence intensity of the device showed an exponential growth trend with increasing voltage and frequency, similar to that of the single Z layer device due to the Z-to-C energy transfer mechanism, as per FIGS. 64 to 69. Notably, the emission peak of ZnS:Cu showed a blue shift with increasing frequency due to the peculiarity of the ZnS:Cu energy level structure, which comprises two different acceptor states. This effect permits additional control over the color output of the device, as per FIG. 70.

It can be seen that the present invention provides a new synthetic protocol for the preparation of AE selenide and/or sulfide compounds. The synthesis involves the calcination of AE carbonates with ZnSe and ZnS in a reducing atmosphere consisting of $H_2$ (10 vol. %) in $N_2$, which is simple, efficient, environmentally benign, and does not involve the use of hazardous chemicals. The synthesis permits concomitant doping of impurity ions such as luminescent lanthanide ions (such as $Eu^{2+}$) in the same one-step reaction, generating tunable photoluminescence that is useful for constructing phosphor-converted ACEL devices in combination with electroluminescent ZnS:Cu as the EL layer for white light emissions.

It should be understood that the above only illustrates examples whereby the present invention may be carried out, and that various modifications and/or alterations may be made thereto without departing from the spirit of the invention.

It should also be understood that certain features of the invention, which are, for clarity, described in the context of separate embodiments, may be provided in combination in a single embodiment. Conversely, various features of the invention which are, for brevity, described in the context of a single embodiment, may also be provided separately or in any appropriate sub-combinations.

The invention claimed is:

1. A method of forming an alkaline-earth metal selenide and/or sulfide compound, including reacting a carbonate of an alkaline-earth metal with zinc selenide (ZnSe) and/or zinc sulfide (ZnS) in an atmosphere of hydrogen ($H_2$) gas and nitrogen ($N_2$) gas, and reacting said carbonate of said alkaline-earth metal with said zinc selenide (ZnSe) and said zinc sulfide (ZnS) in said atmosphere of hydrogen gas (H2) and nitrogen gas (N2) to form a selenium-sulfide alloy of said alkaline-earth metal.

2. The method of claim 1, wherein said hydrogen gas comprises 10 vol. % of said atmosphere.

3. The method of claim 1, wherein said alkaline-earth metal is selected from a group consisting of calcium (Ca), strontium (Sr) and barium (Ba).

4. The method of claim 1, further including reacting said carbonate of said alkaline-earth metal with said zinc selenide (ZnSe) and/or said zinc sulfide (ZnS) at a temperature between 1,100° C. and 1,400° C.

5. The method of claim 1, further including reacting said carbonate of said alkaline-earth metal with said zinc selenide (ZnSe) and/or said zinc sulfide (ZnS) in said atmosphere for not more than 1 hour.

6. The method of claim 1, further including doping said selenium-sulfide alloy of said alkaline-earth metal with luminescent ions.

7. The method of claim 6, wherein said luminescent ions comprise luminescent lanthanide ions.

8. The method of claim 7, wherein said luminescent lanthanide ions comprise europium ions ($Eu^{2+}$).

\* \* \* \* \*